(12) United States Patent
Wong

(10) Patent No.: US 12,461,336 B2
(45) Date of Patent: Nov. 4, 2025

(54) ACHROMATIC FOLDED OPTICAL SYSTEM

(71) Applicant: 3M INNOVATIVE PROPERTIES COMPANY, St. Paul, MN (US)

(72) Inventor: Timothy L. Wong, West St. Paul, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 458 days.

(21) Appl. No.: 17/973,680

(22) Filed: Oct. 26, 2022

(65) Prior Publication Data

US 2024/0142752 A1 May 2, 2024

(51) Int. Cl.
*G02B 9/04* (2006.01)
*H04N 23/55* (2023.01)

(52) U.S. Cl.
CPC ............... *G02B 9/04* (2013.01); *H04N 23/55* (2023.01)

(58) Field of Classification Search
CPC ..... G02B 17/0856; G02B 9/04; G02B 13/003
USPC .................................. 359/646, 717, 736, 793
See application file for complete search history.

(56) References Cited

U.S. PATENT DOCUMENTS

| | | | | |
|---|---|---|---|---|
| 4,679,912 | A * | 7/1987 | Loy | G02B 25/004 359/647 |
| 5,508,849 | A * | 4/1996 | Goodell | G02B 15/10 359/802 |
| 9,772,478 | B2 * | 9/2017 | Shafer | G02B 17/0892 |
| 2019/0384045 | A1 * | 12/2019 | Yun | G02B 27/28 |
| 2020/0064592 | A1 * | 2/2020 | Tashiro | G02B 27/0075 |
| 2023/0176344 | A1 * | 6/2023 | Sun | G02B 25/001 359/717 |
| 2023/0341659 | A1 * | 10/2023 | Chen | G02B 13/0065 |

* cited by examiner

*Primary Examiner* — Bumsuk Won
*Assistant Examiner* — Seth D Moser
(74) *Attorney, Agent, or Firm* — Jonathan L. Tolstedt

(57) ABSTRACT

An optical lens assembly includes an optical axis and two optical lenses having at least one curved major surface, a partial reflector disposed on a first major surface of the lens assembly, and a reflective polarizer disposed on a second major surface. For each of first and second visible wavelengths, and for unpolarized collimated light incident on the assembly from the viewer-side, the assembly focuses the incident light on the display-side, forming a first focused incident light at an average spacing T1 from the optical axis after the light passes through the assembly a first time, and a second focused incident light at an average spacing T2 from the optical axis after the light passes through the assembly three times, such that due to the difference between the first and second wavelengths, the first and second focused incident lights have respective lateral chromatic aberrations D1 and D2, D2/T2<D1/T1.

18 Claims, 15 Drawing Sheets

ACHROMATIC FOLDED OPTICAL SYSTEM

SUMMARY

In some aspects of the present description, an optical lens assembly is provided, the optical lens assembly including an optical axis and configured to be viewed by a viewer from a viewer-side of the optical lens assembly, to have a display disposed on an opposite display-side of the optical lens assembly, and to display a virtual image of an image emitted by the display to the viewer after the emitted image passes through the optical lens assembly three times. The optical lens assembly includes at least two optical lenses having at least one curved major surface, a partial reflector disposed on and conforming to a first major surface of the lens assembly, and a reflective polarizer disposed on and conforming to a second, different than the first, major surface of the lens assembly. The partial reflector has an average optical reflectance of at least 30% for at least each of first and second visible wavelengths in a visible wavelength range extending from about 420 nm to about 680 nm. The first and second visible wavelengths differ by at least 100 nm. For a substantially normally incident light and for each of the first and second visible wavelengths, the reflective polarizer has an optical reflectance of greater than about 60% for the incident light polarized along a first direction and an optical transmittance of greater than about 60% for the incident light polarized along a second direction, orthogonal to the first direction. For a substantially unpolarized collimated light incident on the lens assembly from the viewer-side, the lens assembly focuses the incident light on the display-side of the optical system and forms a first focused incident light at an average spacing T1 from the optical axis after the incident light passes through the lens assembly for a first time, and a second focused incident light at an average spacing T2 from the optical axis after the incident light passes through the lens assembly for second and third times. Due to the difference between the first and second visible wavelengths, the first and second focused incident lights have respective lateral chromatic aberrations D1 and D2, such that the ratio D2/T2 is less than the ratio D1/T1 bp at least a factor of about 2 across at least a 40-degree field of view.

In some aspects of the present description, an optical system is provided, the optical system including an optical axis and configured to have a display disposed on a display-side of the optical system and form a virtual image of the display for a viewer disposed on an opposite viewer-side of the optical system. The optical system includes a partial reflector and a reflective polarizer. The partial reflector has an average optical reflectance of at least 30% for at least each of first and second visible wavelengths in a visible wavelength range extending from about 420 nm to about 680 nm. The first and second visible wavelengths are different by at least 100 nm. The reflective polarizer has an optical reflectance of greater than about 60% for the incident light polarized along a first direction and an optical transmittance of greater than about 60% for the incident light polarized along a second direction, orthogonal to the first direction. When an object is placed near a first focal plane of the optical system, a first virtual image is formed when light propagating from the object towards the optical system traverses a space defined between the partial reflector and the reflective polarizer a total of one time. When the same object is placed near a second focal plane of the optical system, a second virtual image is formed when light propagating from the object towards the optical system traverses a space defined between the partial reflector and reflective polarizer a total of three times. The first virtual image subtends an angle θ1 for light of the first visible wavelength and subtends a second angle θ2 for light of the second visible wavelength, and the second virtual image subtends a third angle θ3 for light of the first visible wavelength and subtends a fourth angle θ4 for light of the second visible wavelength. Wherein A1 is defined as $(|\theta1-\theta2|/((\theta1+\theta2)/2))$ and A3 is defined as $(|\theta3-\theta4|/((\theta3+\theta4)/2))$, such that A3 is less than A1.

In some aspects of the present description, an optical system is provided, the optical system including an optical axis and configured to have a display disposed on a display-side of the optical system and to form a virtual image of an image emitted by the display to a viewer disposed on an opposite viewer-side of the optical system near an eye location. The optical system includes at least two optical lenses having at least one curved major surface. First and second partial reflectors are disposed on and conform to different respective first and second major surfaces of the at least two optical lenses. The virtual image is formed after the emitted image traverses a space defined between the partial reflector and the reflective polarizer a total of three times. For first and second wavelengths in a visible wavelength range extending from about 420 nm to about 680 nm, the first and second visible wavelengths different by at least 100 nm, and due to the difference between first and second visible wavelengths, when substantially collimated light of the first and second wavelengths is incident on the optical system from the viewer-side near an eye location at a given field angle, and focuses at a respective focal points at real image heights H1 and H2, the image has a lateral chromatic aberration such that a magnitude of $(H1-H2)/((H1+H2)/2)$ remains less than about 0.2% when the field angle increases from about 5 to about 40 degrees.

In some aspects of the present description, an optical system is provided, the optical system including a field of view of greater than about 60 degrees and an optical axis and configured to have a display disposed on a display-side of the optical system and form a virtual image of an image emitted by the display to a viewer disposed on an opposite viewer-side of the optical system near an eye location. The optical system includes at least two optical lenses having at least one curved major surface, and first and second partial reflectors disposed on and conforming to different respective first and second major surfaces of the at least two optical lenses. The virtual image is formed after the emitted image traverses a space defined between the partial reflector and the reflective polarizer a total of three times. Due to a difference of at least 100 nm between at least first and second wavelengths in a visible wavelength range extending from about 420 nm to about 680 nm, when substantially collimated light of the first and second wavelengths is incident on the optical system from the viewer-side near an eye location at a given field angle, and focuses at respective focal points at real image heights H1 and H2, the image has a lateral chromatic aberration such that a magnitude of $(H1-H2)/((H1+H2)/2)$ remains less than about 0.15% across at least a 60-degree field of view.

DETAILED DESCRIPTION

Figure 1A:
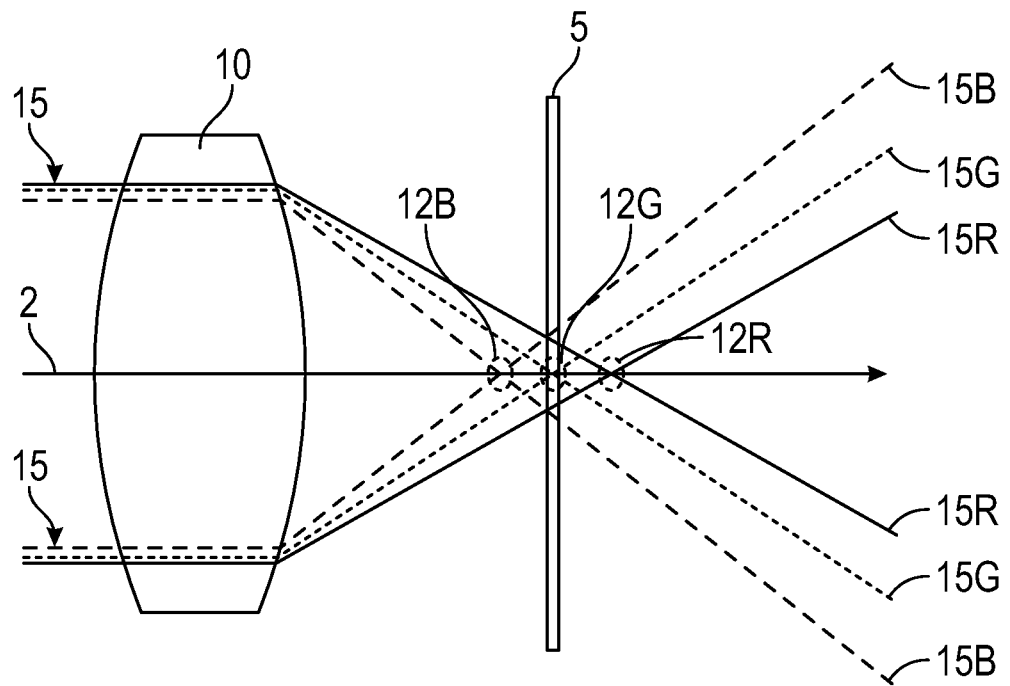
FIG. 1A is a side view of an optical lens from the prior art, exhibiting a longitudinal chromatic aberration.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Optical systems which rely on refractive optics often suffer from chromatic aberrations when light of different wavelengths do not have a common focus. For example, chromatic focal shift, also called longitudinal chromatic aberration, occurs when light of different wavelengths focuses at a different depth. This can be thought of as the lens having a different focal length for different wavelengths.

Lateral color shift, also called lateral chromatic aberration or lateral color, occurs when light of different wavelengths focus at different distances from the optical axis on the image plane. This can be thought of as the lens having a different magnification for different wavelengths. For example, light of one wavelength (e.g., wavelengths of blue light) may be refracted at a different angle than light of a second, different wavelength (e.g., wavelengths of green light, or wavelengths of red light), such that the colors are separated by some distance in the virtual image, creating a rainbow effect or fringing of the image, especially at wider field angles. As blue wavelengths are the shortest human-visible wavelengths, and red wavelengths of light are the longest human-visible wavelengths, we can determine the total amount of aberration in an optical system by comparing what happens to blue wavelengths relative to what happens to red wavelengths.

To reduce these chromatic aberrations, achromatic lenses (e.g., achromatic doublets) may use materials of different refractive indices and refractive index dispersions to balance chromatic aberrations. However, achromatic lenses which are configured to reduce chromatic aberrations in a single-pass (non-folded) optical system may exacerbate the chromatic aberrations when such an optical system is used as a triple-pass (folded) optical system.

According to some aspects of the present description, an optical lens assembly with a folded optical path is configured to reduce chromatic aberrations. In some embodiments, the optical lens assembly may be configured to have a larger chromatic aberration when light traverses through the optical lens assembly a single time (e.g., a non-folded optical path), and a comparatively reduced chromatic aberration when light traverses through the optical lens assembly a total of three times (e.g., a folded optical path). In some embodiments, the optical lens assembly may include an optical axis and may be configured to be viewed by a viewer from a viewer-side of the optical lens assembly, to have a display (e.g., a picture generating unit, or PGU) disposed on an opposite display-side of the optical lens assembly, and to display a virtual image of an image emitted by the display to the viewer after the emitted image passes through the optical lens assembly three times. In some embodiments, the optical lens assembly may include at least two optical lenses (e.g., a "crown" element and a "flint" element) having at least one curved major surface, a partial reflector disposed on and conforming to a first major surface of the lens assembly, and a reflective polarizer disposed on and conforming to a second, different than the first, major surface of the lens assembly. The partial reflector and the reflective polarizer may be disposed such that they define a space therebetween and to create a portion of a folded optical light path.

In some embodiments, the partial reflector may have an average optical reflectance of at least 30% for at least each of a first visible wavelength and a second visible wavelength in a visible wavelength range extending from about 420 nm to about 680 nm. In some embodiments, the first visible wavelength may be in a blue wavelength range extending between about 420 nm and about 480 nm, and the second visible wavelength may be in a red wavelength range extending between about 590 nm and about 670 nm. In some embodiments, the first and second visible wavelengths may differ by at least 100 nm.

In some embodiments, for a substantially normally incident light and for each of the first and second visible wavelengths, the reflective polarizer has an optical reflectance of greater than about 60% for the incident light polarized along a first direction (e.g., light polarized along the x-axis of the reflective polarizer) and an optical transmittance of greater than about 60% for the incident light polarized along a second direction, orthogonal to the first direction (e.g., light polarized along the y-axis of the reflective polarizer). In some embodiments, for a substantially unpolarized collimated light incident on the lens assembly from the viewer-side, the lens assembly focuses the incident light on the display-side of the optical system and forms a first focused incident light at an average spacing T1 from the optical axis after the incident light passes through the lens assembly for a first time, and a second focused incident light at an average spacing T2 from the optical axis after the incident light passes through the lens assembly for second and third times. For the purposes of this specification, an "optical axis" shall be defined to be an imaginary line passing through the center of curvature of a lens or lens assembly and substantially parallel to the axis of symmetry for the optical system. Some of the optical systems described herein may have a folded optical path where polarized components (e.g., a partial reflector, a reflective polarizer, etc.) are used to "fold" or reflect/refract the path of the light rays to achieve a longer optical path in a shorter physical distance. It can be said that the optical axis in such a system is a "folded" optical axis. However, the term "optical axis" as used in the description and claims of this document shall refer to the unfolded axis passing through the center of curvature of a lens or lens assembly and substantially parallel to the axis of symmetry for the optical system. The average spacings T1 and T2 described above are meant to be measured from this central, unfolded optical axis.

In some embodiments, due to the difference between the first and second visible wavelengths, the first and second focused incident lights may have respective lateral chromatic aberrations D1 and D2, such that the ratio D2/T2 is less than the ratio D1/T1 by at least a factor of about 2 across at least a 40-degree, or 45-degree, or 50-degree, or 55-degree, or 65-degree, or 70-degree field of view.

In some embodiments, in addition to the improvements in lateral chromatic aberrations, the optical lens assembly may exhibit a relatively small axial (or longitudinal) chromatic aberration. For example, in some embodiments, the optical lens assembly may be configured such that, due to the difference between the first and second visible wavelengths, the optical lens assembly has a diopter focus that varies by less than 0.5, or 0.4, or 0.3, or 0.2, 0.1, or 0.05 diopters.

For the purposes of this document, an optical diopter (or simply "diopter") is defined as a unit of refractive power that is equal to the reciprocal of the focal length in meters of a give optical system (e.g., a lens or an optical lens assembly). Therefore, if an optical system is configured such that it produces a focused image at a distance of 2 meters, it has an optical diopter of ½ or 0.5 diopters, and a focused image at a distance of 0.5 meters has an optical diopter of (1/0.5) or 2 diopters. In an axial chromatic aberration, the first visible wavelength (e.g., a wavelength of blue light) and the second visible wavelength (e.g., a wavelength of red light) will be refracted by different amounts as they pass through the optical lens assembly, such that the virtual image formed by the first visible wavelength has a different virtual image distance than the virtual image formed by the second visible wavelength. The differences between these two different virtual image distances should be such that the optical diopter of the optical lens assembly differs by less than 0.5 diopters.

In some embodiments, the optical lens assembly can further compensate for an axial chromatic aberration using a multilayer optical film (e.g., a reflective polarizer). For example, the reflective polarizer may include at least a plurality of first interference layers and a plurality of second interference layers, where the plurality of first interference layers is separated from the plurality of second interference layers by a distance d. Each of the pluralities of first interference layers and second interference layers may be configured to have differing optical characteristics.

For example, in such embodiments, the plurality of first interference layers may be configured to substantially reflect light of the first visible wavelength having a first polarization state (e.g., light of a linear p polarization type), to substantially transmit light of the first visible wavelength having an orthogonal second polarization state (e.g., light of a linear s polarization type), and to substantially transmit light of the second visible wavelength. Conversely, the plurality of second interference layers may be configured to substantially reflect light of the second visible wavelength having a first polarization state (e.g., light of a linear p polarization type), to substantially transmit light of the second visible wavelength having an orthogonal second polarization state (e.g., light of a linear s polarization type), and to substantially transmit light of the first visible wavelength.

In some embodiments, the distance d may be chosen to reduce a variation in an optical diopter of the optical lens assembly due to the difference between the first and second visible wavelengths.

Stated another way, in some embodiments, the reflective polarizer may be configured to reflect light of the first visible wavelength at a first depth within the reflective polarizer, and to reflect light of the second visible wavelength at a second depth within the reflective polarizer. By configuring the reflective polarizer to reflect (at least some polarizations types of) the two different wavelengths of light at different depths within the reflective polarizer, the focal lengths of the system for the first and second wavelengths can be adjusted to substantially match each other, or at least be separated by a smaller distance.

In some embodiments, the distance d may be configured such that it reduces the variation in the optical diopter of the optical lens assembly by at least 10%, or at least 20%, or at least 30%, or at least 50%, or at least 75%, or at least by a factor of 2, or at least by a factor of 3, or at least by a factor of 5.

According to some aspects of the present description, an optical system includes an optical axis and is configured to have a display disposed on a display-side of the optical system and form a virtual image of the display for a viewer disposed on an opposite viewer-side of the optical system. In some embodiments, the optical system may include a partial reflector and a reflective polarizer. The partial reflector may have an average optical reflectance of at least 30% for at least each of first and second visible wavelengths in a visible wavelength range extending from about 420 nm to about 680 nm. The first and second visible wavelengths are different by at least 100 nm. In some embodiments, the first visible wavelength may be in a blue wavelength range extending between about 420 nm and about 480 nm, and the second visible wavelength may be in a red wavelength range extending between about 590 nm and about 670 nm.

In some embodiments, the reflective polarizer may have an optical reflectance of greater than about 60%, or greater than about 65%, or greater than about 70%, or greater than about 75%, or greater than about 80%, or greater than about 85% for the incident light polarized along a first direction and an optical transmittance of greater than about 60%, or greater than about 65%, or greater than about 70%, or greater than about 75%, or greater than about 80%, or greater than about 85% for the incident light polarized along a second direction, orthogonal to the first direction.

In some embodiments, when an object is placed near a first focal plane of the optical system, a first virtual image is formed when light propagating from the object towards the optical system traverses a space defined between the partial reflector and the reflective polarizer a total of one time. When the same object is placed near a second focal plane of the optical system, a second virtual image is formed when light propagating from the object towards the optical system traverses a space defined between the partial reflector and the reflective polarizer a total of three times. The first virtual image subtends a first angle $\theta1$ for light of the first visible wavelength and subtends a second angle $\theta2$ for light of the second visible wavelength, and the second virtual image subtends a third angle $\theta3$ for light of the first visible wavelength and subtends a fourth angle $\theta4$ for light of the second visible wavelength. Wherein A1 is defined as $(|\theta1-\theta2|/((\theta1+\theta2)/2))$ and A3 is defined as $(|\theta3-\theta4|/((\theta3+\theta4)/2))$, such that A3 is less than A1.

Stated another way, a first virtual image may be formed by the optical system after light traverses the space between the partial reflector and the reflective polarizer a single time (i.e., as it would in a non-folded optical system). This first virtual image may have different magnifications for each of the first and second visible wavelengths. That is, the first virtual image may subtend a first angle $\theta1$ for light of the first visible wavelength, and a second, different angle $\theta2$ for light of the second visible wavelength (because the light of the first visible wavelength will be refracted by the optical system differently than light of the second visible wavelength). Similarly, a second virtual image may be formed by the optical system after light traverses the space between the partial reflector and the reflective polarizer a total of three times (i.e., as it would in a folded optical system). This second virtual image may have different magnifications for each of the first and second visible wavelengths. That is, the second virtual image may subtend a third angle $\theta3$ for light of the first visible wavelength, and a second, different angle $\theta4$ for light of the second visible wavelength. This collection of subtended angles can be compared and normalized, as described above, to determine to determine a difference in magnification between the first and second visible wavelengths for each of the first virtual image (the single-pass image) and the second virtual image (the triple-pass image). The difference in magnification (i.e., the normalized difference in subtended angles over each image) will be less for the triple-pass optical system than for the single-pass optical system. This difference (or variation) in subtended angle over an image is representative of the amount of lateral chromatic aberration in the optical system.

In some embodiments, A3 may be less than A1 by at least 30%, or at least 40%, or at least 50%, or at least 60%, or at least 70%, or at least 80%, or at least 90%, or at least 100%, or at least 105% across a 100-degree field of view. In some embodiments, A3 may be less than A1 by at least 300%, or at least 350%, or at least 400% across a 50-degree, or a 55-degree, or a 60-degree, or a 65-degree field of view. In some embodiments, the magnitude of A3 may remain less than about 0.2%, or about 0.15%, or about 0.1%, or about 0.08%, or about 0.06%, or about 0.04%, or about 0.02% when the field angle increases from about 5 to about 40 degrees.

In some embodiments, the optical system may exhibit relatively low longitudinal chromatic aberrations (low variation in focal length over the visible wavelength range), as well. In some embodiments, due to the difference between the first and second visible wavelengths, the optical system may have an optical diopter that varies by less than 0.5, or 0.4, or 0.3, or 0.2 diopters.

In some embodiments, the optical system can further compensate for an axial chromatic aberration using a multilayer optical film (e.g., a reflective polarizer). In some embodiments, the multilayer optical film may include a plurality of first interference layers and a plurality of second interference layers, where the plurality of first interference layers is separated from the plurality of second interference layers by a distance d. In such embodiments, the plurality of first interference layers may be configured to substantially reflect light of the first visible wavelength having a first polarization state, to substantially transmit light of the first visible wavelength having an orthogonal second polarization state, and to substantially transmit light of the second visible wavelength. Conversely, the plurality of second interference layers may be configured to substantially reflect light of the second visible wavelength having a first polarization state, to substantially transmit light of the second visible wavelength having an orthogonal second polarization state, and to substantially transmit light of the first visible wavelength. In some embodiments, the distance d may be chosen to reduce a variation in an optical diopter of the optical lens assembly due to the difference between the first and second visible wavelengths.

In some embodiments, the distance d may be configured such that it reduces the variation in the optical diopter of the optical lens assembly by at least 10%, or at least 20%, or at least 30%, or at least 50%, or at least 75%, or at least by a factor of 2, or at least by a factor of 3, or at least by a factor of 5.

According to some aspects of the present description, an optical system includes an optical axis and is configured to have a display disposed on a display-side of the optical system and to form a virtual image of an image emitted by the display to a viewer disposed on an opposite viewer-side of the optical system near an eye location. In some embodiments, the optical system may include at least two optical lenses having at least one curved major surface. In some embodiments, first and second partial reflectors may be disposed on and conform to different respective first and second major surfaces of the at least two optical lenses. In some embodiments, the virtual image may be formed after the emitted image traverses a space defined between the partial reflector and the reflective polarizer a total of three times. In some embodiments, and for first and second wavelengths in a visible wavelength range extending from about 420 nm to about 680 nm, the first and second visible wavelengths different by at least 100 nm, and due to the difference between first and second visible wavelengths, when substantially collimated light of the first and second wavelengths is incident on the optical system from the viewer-side near an eye location at a given field angle, and focuses at a respective focal points at real image heights H1 and H2, the image may have a lateral chromatic aberration such that a magnitude of $(H1-H2)/((H1+H2)/2)$ remains less than about 0.2%, or less than about 0.15%, or less than about 0.1%, or less than about 0.08%, or less than about 0.06%, or less than about 0.04%, or less than about 0.02% when the field angle increases from about 5 to about 40 degrees.

In some embodiments, the optical system may exhibit relatively low longitudinal chromatic aberrations (low variation in focal length over the visible wavelength range), as well. In some embodiments, due to the difference between the first and second visible wavelengths, the optical system may have an optical diopter that varies by less than 0.5, or 0.4, or 0.3, or 0.2 diopters.

In some embodiments, the optical system can further compensate for an axial chromatic aberration using a multilayer optical film (e.g., a reflective polarizer). In some embodiments, the reflective polarizer may include a plurality of first interference layers spaced apart by a distance d from a plurality of second interference layers. In some embodiments, the plurality of first interference layers may be configured to substantially reflect light of the first wavelength having a first polarization state, to substantially transmit light of the first wavelength having an orthogonal second polarization state, and to substantially transmit light of the second wavelength. In some embodiments, the plurality of second interference layers may be configured to substantially reflect light of the second wavelength having a first polarization state, to substantially transmit light of the second wavelength having an orthogonal second polarization state, and to substantially transmit light of the first wavelength. In such embodiments, the distance d may be configured such that it reduces a variation in an optical diopter of the optical system due to the difference between the first and second wavelengths. In some embodiments, the distance d may reduce the variation in the optical diopter of the optical system by at least 10%, or at least 20%, or at least 30%, or at least 50%, or at least 75%, or at least by a factor of 2, or at least by a factor of 3, or at least by a factor of 5.

According to some aspects of the present description, an optical system may include a field of view of greater than about 60 degrees and an optical axis. In some embodiments, the optical system may be configured to have a display disposed on a display-side of the optical system and form a virtual image of an image emitted by the display to a viewer disposed on an opposite viewer-side of the optical system. In some embodiments, the optical system may include at least two optical lenses (e.g., a "crown" element and a "flint" element) having at least one curved major surface, and first and second partial reflectors disposed on and conforming to different respective first and second major surfaces of the at least two optical lenses and defining a space therebetween.

According to some aspects of the present description, an optical system may include a field of view of greater than about 60 degrees and an optical axis. The optical system may be configured to have a display disposed on a display-side of the optical system and to form a virtual image of an image emitted by the display to a viewer disposed on an opposite viewer-side of the optical system near an eye location. In some embodiments, the optical system may include at least two optical lenses having at least one curved major surface, and first and second partial reflectors disposed on and conforming to different respective first and second major surfaces of the at least two optical lenses. In some embodiments, the virtual image may be formed after the emitted image traverses a space defined between the partial reflector and the reflective polarizer a total of three times. In some embodiments, due to a difference of at least 100 nm between at least first and second wavelengths in a visible wavelength range extending from about 420 nm to about 680 nm, when substantially collimated light of the first and second wavelengths is incident on the optical system from the viewer-side near an eye location at a given field angle, and focuses at respective focal points at real image heights H1 and H2, the image has a lateral chromatic aberration such that a magnitude of $(H1-H2)/((H1+H2)/2)$ remains less than about 0.15%, or less than about 0.12%, or less than about 0.10% across at least a 60-degree field of view. In some embodiments, the magnitude of $(H1-H2)/((H1+H2)/2)$ may be less than about 0.25%, or 0.22%, or 0.2% across at least an 80-degree, or an 85-degree, or a 90-degree, or a 95-degree, or a 100-degree field of view.

In some embodiments, the optical system may exhibit a longitudinal chromatic aberration such that, due to the difference between the first and second wavelengths, the optical system has an optical diopter that varies by less than 0.5, or less than 0.4, or less than 0.3, or less than 0.2 diopters.

In some embodiments, the reflective polarizer may be configured such it further reduces longitudinal chromatic aberration. For example, in some embodiments, the reflective polarizer may include a plurality of first interference layers spaced apart by a distance d from a plurality of second interference layers. In such embodiments, the plurality of first interference layers may be configured to substantially reflect light of the first wavelength having a first polarization state, to substantially transmit light of the first wavelength having an orthogonal second polarization state, and to substantially transmit light of the second wavelength. In such embodiments, the plurality of second interference layers may be configured to substantially reflect light of the second wavelength having a first polarization state, to substantially transmit light of the second wavelength having an orthogonal second polarization state, and to substantially transmit light of the first wavelength. In some embodiments, the distance d may be configured such that it reduces a variation in an optical diopter of the optical system due to the difference between the first and second wavelengths. In some embodiments, the distance d may reduce the variation in the optical diopter of the optical system by at least 10%, or at least 20%, or at least 30%, or at least 50%, or at least 75%, or at least by a factor of 2, or at least by a factor of 3, or at least by a factor of 5.

In some embodiments, the first wavelength may be in a blue wavelength range extending between about 420 nm and about 480 nm, and the second wavelength may be in a red wavelength range extending between about 590 nm and about 670 nm.

According to some aspects of the present description, an optical system may include an optical axis and may be configured to have a display disposed on a display-side of the optical system and to form a virtual image of an image emitted by the display to a viewer disposed on an opposite viewer-side of the optical system. In some embodiments, the optical system may include at least two optical lenses having at least one curved major surface, and first and second partial reflectors disposed on and conforming to different respective first and second major surfaces of the at least two optical lenses.

Turning now to the figures, FIG. 1A is a side view of an optical lens from the prior art, showing the effects of a longitudinal, or axial, chromatic aberration. Rays of light 15 containing multiple wavelengths (e.g., white light) enter one side of a lens 10. Due to dispersion in the refractive index of the lens material over a range of wavelengths, different wavelengths of light are refracted by different amounts. Typically, the extent to which any particular wavelength is refracted increases as the wavelength of light decreases. For example, shorter wavelengths of light (e.g., blue wavelengths) are refracted at higher angles than longer wavelengths (e.g., red wavelengths). Therefore, as rays 15 pass through lens 10, the light is separated and dispersed into multiple rays of light based on the wavelength of the light. For example, ray 15 is separated into rays 15B, 15G, and 15R, which represent wavelengths of blue, green, and red light, respectively. It should be noted that other wavelengths of light (e.g., violet, orange, ultraviolet, infrared, etc.) are also present, but, for simplicity only rays 15B, 15G, and 15R are shown to illustrate the separations of color.

As shown in FIG. 1A, this separation of light at different angles means that the point where the light is focused will be closer to lens 10 for blue light 15B and farther away for red light 15R. This creates multiple focal points (multiple focal lengths), including focal point 12B for blue light, focal point 12G for green light, and focal point 12R for red light. In FIG. 1A, image plane 5 represents the intended focal plane for the image, but blue light 15B focuses at focal point 12B, closer than image plane 5, and red light 15R focuses at focal point 12R, farther away than image plane 5.

Figure 1B:
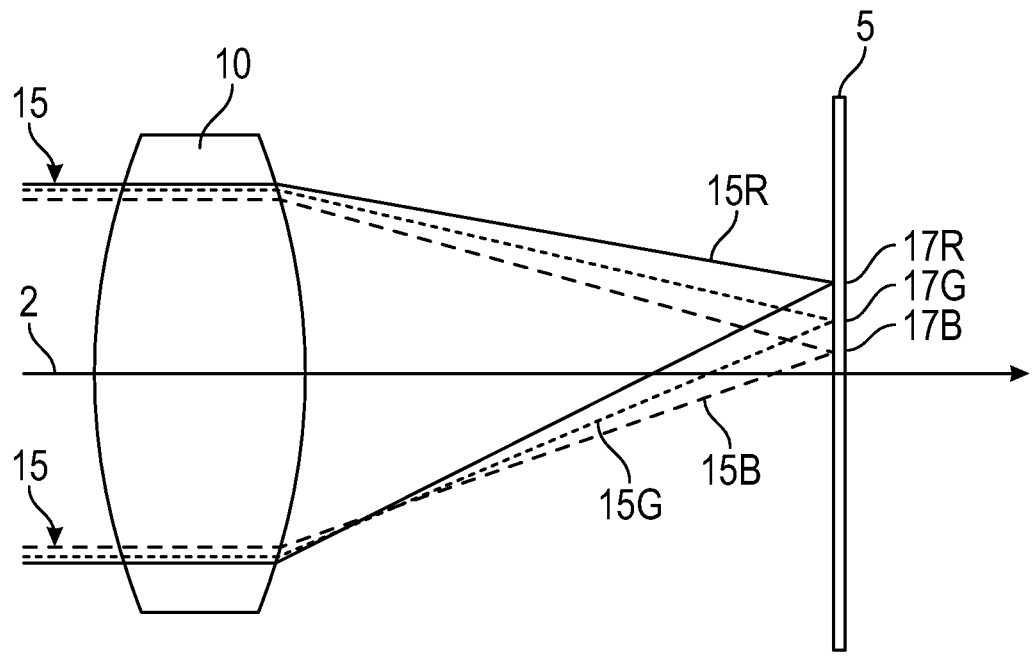
FIG. 1B is a side view of an optical lens from the prior art, exhibiting a lateral chromatic aberration.

FIG. 1B is a side view of an optical lens from the prior art, exhibiting a lateral, or transverse, chromatic aberration. In this case, light rays 15 are again refracted into light 15B, 15G, and 15R, representing blue, green, and red wavelengths of light. Lateral chromatic aberration occurs when, due to the varying refraction over the wavelength range, light rays 15B, 15G, and 15R produce images at the image plane 5 which have slightly different image heights 17B, 17G, and 17R. Another way of saying this is that the images created on image plane 5 by light rays 15B, 15G, and 15R will have slightly different image sizes, or slightly different magnifications. Lateral chromatic aberration is typically greater based on the distance from the optical axis 2 of the point in the image being examined. That is, a light that is substantially parallel to and near the optical axis 2 and is focused near the optical axis 2 on image plane 5 will show little to no color shift. As the field angle (i.e., object height) increases (i.e., when focusing light from portions of an object further from optical axis 2), the amount of color shift (i.e., lateral chromatic aberration) increases accordingly. This may be seen as "color fringing" near the outside edges of the image formed on image plane 5.

Figure 2:
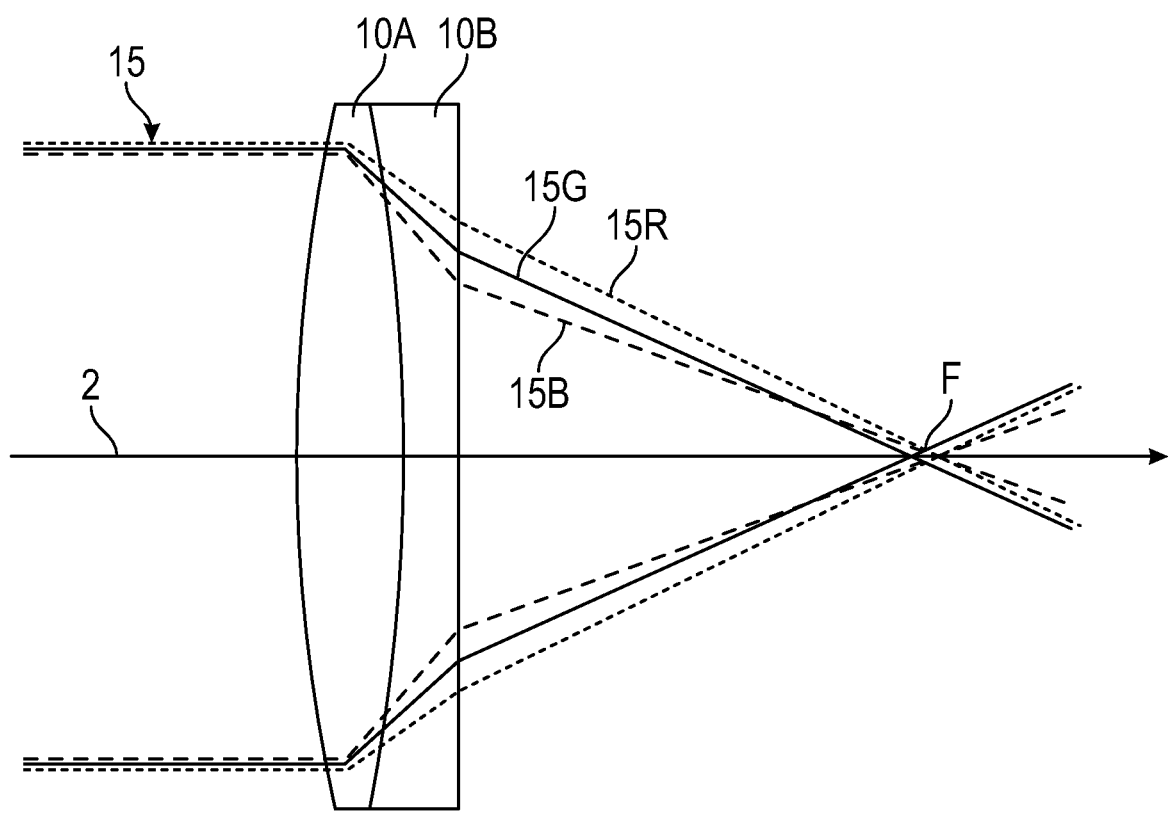
FIG. 2 is a side view of an achromatic lens doublet from the prior art, configured to address chromatic aberrations.

Of the two primary types of chromatic aberration shown in FIGS. 1A and 1B, lateral chromatic aberration is often the most noticeable to a viewer in lenses that act as eyepieces such as in head-mounted display systems. The human eye can more readily adapt to relatively small differences in focal shift between colors (longitudinal chromatic aberrations, as seen in FIG. 1A), as long as the difference in diopter for the different colors is relatively small. To compensate for lateral chromatic aberrations, as shown in FIG. 1B, some existing systems rely on an achromatic lens doublet, where two different lens components with different optical properties are used to reduce the amount of chromatic aberration. FIG. 2 shows an example of an achromatic lens doublet from the prior art, which has been configured to address lateral chromatic aberrations in a single-pass (non-folded) optical system. In such systems, lens element 10A (known as the "crown" element) may be made of a first material, and lens element 10B (known as the "flint" element) may be made of a different, second material. The first and second materials have different refractive indices and dispersions and the optical power of each lens can be configured to reduce chromatic aberrations. For example, in the example of FIG. 2, lens element 10A may have a positive optical power and a low refractive index dispersion across wavelengths, and lens element 10B may have a negative optical power and a high refractive index dispersion across wavelengths. The elements 10A and 10B can be configured such that, when they are combined, the lens doublet (both elements taken as a system) have an overall positive optical power but a relatively small amount of chromatic aberration.

The achromatic doublet is an example of an achromatic refractive lens, and many other multi-element refractive optical systems use the concept of negative, high dispersion (e.g., "flint glass") elements to correct for chromatic aberrations when light is transmitted through the optical system. In folded optical systems, especially polarized catadioptric systems, the light may be transmitted through some of the optical elements a total of three times, both before and after reflection from two reflective surfaces. To correct for chromatic aberrations in a polarized catadioptric system, a different type of achromatic lens can be used which is not achromatic in single-pass transmission but is achromatic in a triple-pass mode.

According to some aspects of the present description, an achromatic folded optical system is provided which exhibits a relatively larger lateral chromatic aberration when used in a single-pass, non-folded system and a significantly smaller chromatic aberration when used in a polarized catadioptric optical system (i.e., an optical system which uses polarization of light to "fold" light rays to the increase optical length of the system).

Figure 3:
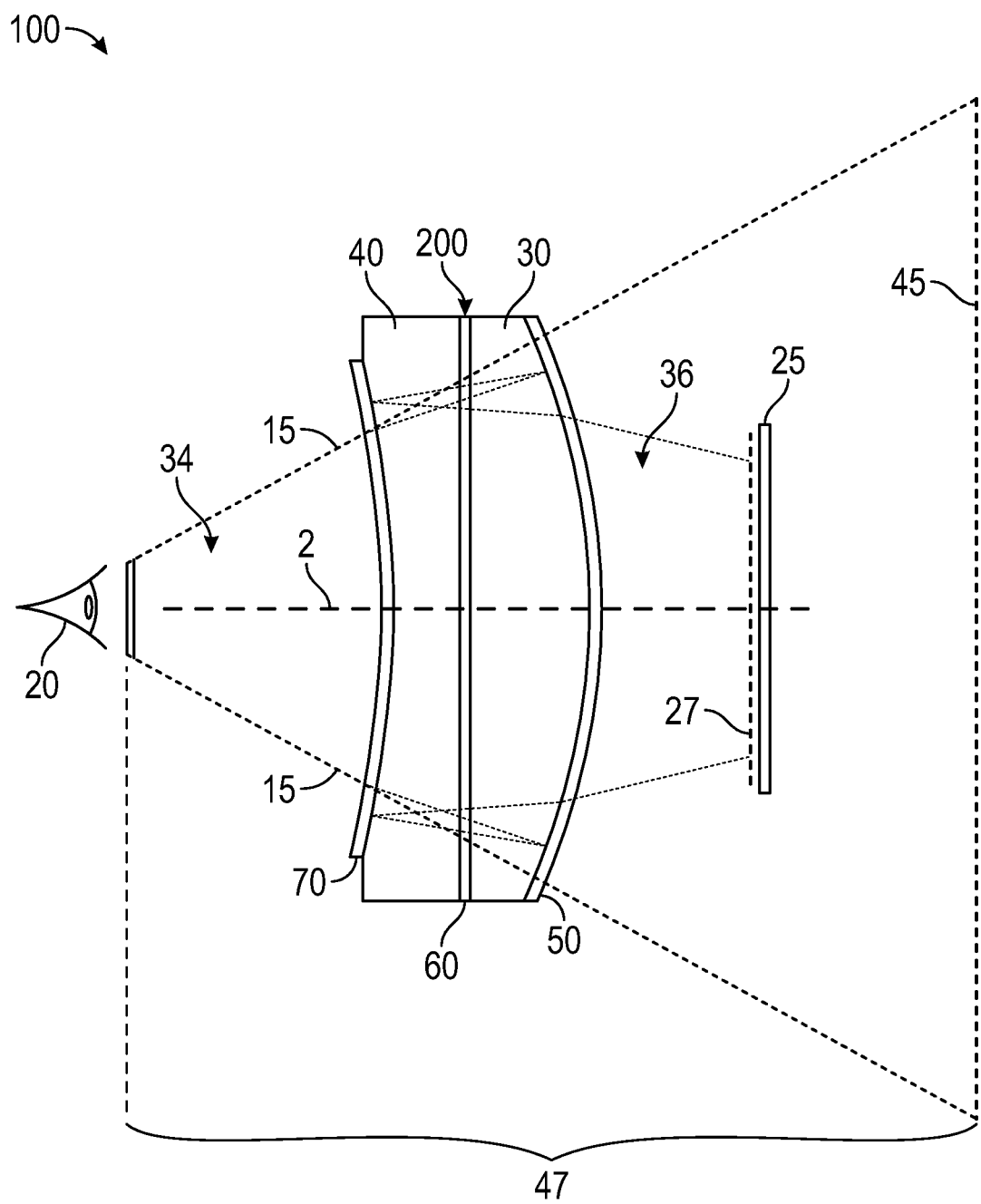
FIG. 3 is a side view of an achromatic folded optical system, in accordance with an embodiment of the present description.

FIG. 3 is a side view of such an achromatic folded optical system, according to the present description. In some embodiments, achromatic folded optical system 100 may include an optical lens assembly 200 and an optical axis 2. In some embodiments, optical lens assembly 200 may include at least two optical lenses. For example, optical system 100 may include a first lens 30 (e.g., a crown element) and a second lens 40 (e.g., a flint element).

The optical lens assembly 200 may be configured to be viewed by a viewer 20 on a viewer-side 34 of the optical lens assembly 200 and to have a display 25 disposed on a display-side 36 of the optical lens assembly 200. In some embodiments, optical lens assembly 200 may be configured to display a virtual image 45 of an image 27 emitted by display 25 to the viewer 20 after the emitted image 27 passes through the optical lens assembly 200 (as image light rays 15) a total of three times. Virtual image 45 may be perceived by viewer 20 to appear at a virtual image distance 47 from viewer 20. In some embodiments, optical lens assembly 200 may have at least one curved major surface to provide optical power in order to form a virtual image 45 to be viewed by viewer 20.

In some embodiments, optical lens assembly 200 may further comprise at least two partial reflectors, a first partial reflector 50 and a second partial reflector 70. First 50 and second 70 partial reflectors may use a combination of polarization-dependent reflection and refraction to create a folded optical path for image rays 15. In some embodiments, optical lens assembly 200 may include an additional optical element to modify the polarization state of light passing through it. In some embodiments, this additional optical element may be a quarter wave plate 60.

In some embodiments, the first partial reflector 50 may conform to a first major surface of the optical lens assembly 200 (e.g., on a major surface on the viewer-side 34). In some embodiments, the first partial reflector 50 may have an average optical reflectance of at least 30% for at least each of a first visible wavelength (e.g., a wavelength of blue light) and a second visible wavelength (e.g., a wavelength of red light) in a visible wavelength range extending from about 420 nm to about 680 nm. In some embodiments, the first and second visible wavelengths may differ by at least 100 nm.

In some embodiments, the second partial reflector 70 may be a multilayer optical film such as a reflective polarizer. In some embodiments, second partial reflector 70 may be disposed on and conform to a second, different than the first, major surface of optical lens assembly 200 (e.g., on a major surface on the display-side 36). The second partial reflector 70 may be configured such that, for a substantially normally incident light and for each of the first and second visible wavelengths, the second partial reflector 70 may have an optical reflectance of greater than about 60% for the incident light polarized along a first direction (e.g., light polarized along an x-axis of the multilayer optical film) and an optical transmittance of greater than about 60% for the incident light polarized along a second direction, orthogonal to the first direction (e.g., light polarized along a y-axis of the multilayer optical film).

In some embodiments, the first partial reflector 50 and the second partial reflector 70 define a space therebetween. Light rays 15 emitted by display 25 (from emitted image 27) on display-side 36 of optical lens assembly 200 first pass through first partial reflector 50, entering the space between first partial reflector 50 and second partial reflector 70. In some embodiments, light rays 15 then pass through quarter wave plate 60 which modifies the polarization state of the light. Light rays 15 are then reflected from second partial reflector 70, pass back through quarter wave plate 60, and are reflected from first partial reflector 50. Light rays 15 then pass back through quarter wave plate 60, which modifies their polarization state such that light rays 15 now are substantially transmitted by second partial reflector 70, where they pass into the eye of viewer 20, allowing viewer 20 to perceive virtual image 45.

As described elsewhere herein, virtual image 45 may exhibit one or both types of chromatic aberrations (lateral and/or longitudinal) due to the differences in refraction based on different wavelengths of light. The amount of chromatic aberration may be controlled to some degree by choosing materials for the first optical lens 30 and the second optical lens 40 to have different refractive index dispersions (e.g., Abbe numbers). The methods used in the creation of single-pass optical systems (non-folded optical systems) of the prior art which have reduced chromatic aberrations cannot be applied to the creation of an optical system with a folded optical path. On the contrary, selecting lens components in a folded optical system to reduce chromatic aberrations will typically cause the chromatic aberrations to increase were the same optical system to be used in a single-pass, non-folded optical system. Stated another way, previously known methods for reducing chromatic aberrations (and specifically lateral chromatic aberrations) in non-folded optical systems actually teach away from the methods of the present description.

Figure 4A:
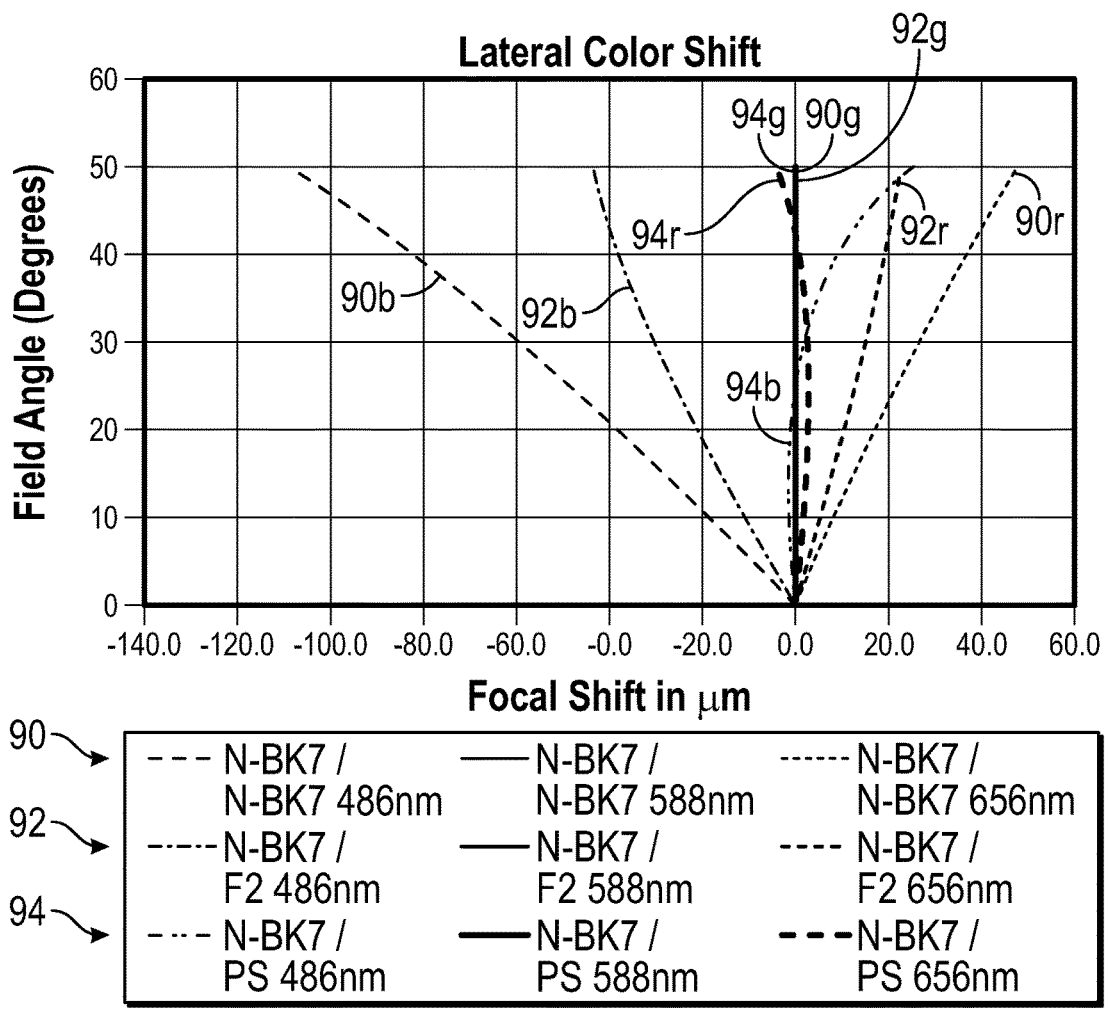
FIGS. 4A and 4B show levels of lateral chromatic aberration exhibited by different system material types, in accordance with an embodiment of the present description.

FIG. 4A is a chart showing levels of lateral chromatic aberrations exhibited by different system material types, according to the present description. The chart shows the lateral color shift (i.e., the lateral chromatic aberration) as modeled for three different optical systems. The reference, or zero lateral focal shift position in the chart for each system is the focal point for 588 nm light at a given field angle of the system. The three different optical systems are labeled 90, 92, and 94, and are based on a folded system architecture with two lens components such as shown in FIG. 3. Each of the three systems has a positive (e.g., plano-convex) element (item 30, FIG. 3) of N-BK7 glass, but each system uses a different material for the second, negative element (item 40, FIG. 3) having different refractive index dispersions (e.g., different Abbe numbers), as described below:

Optical System 90: Positive element of N-BK7 glass, negative element of N-BK7 glass.
Optical System 92: Positive element of N-BK7 glass, negative element of F2 flint glass.
Optical System 90: Positive element of N-BK7 glass, negative element of polystyrene plastic.

For each of optical systems 90, 92, and 94, the chart of FIG. 4A shows the lateral shift in microns for three different wavelengths of light, 486 nm (blue light), 588 nm (green light), and 656 nm (red light) over a variety of different field angles (viewing angles) from 0 to 50 degrees off of the optical axis. As is shown in FIG. 4A, lateral chromatic aberrations increase with the viewing angle.

Although FIG. 4A shows three plot lines each for systems 90, 92, and 94 (one plot line for each of the blue, green, and red wavelength), the best measure of lateral chromatic aberration is the shift in microns between the blue and red wavelengths of light. The modeling shows that the green wavelengths (represented by plotlines 90g, 92g, and 94g, which are substantially identical plots) are centered on zero focal shift.

Looking first at optical system 90, which has a positive element and negative element of the same material (N-BK7 glass), the lateral chromatic aberration of this system can be measured by the separation in microns between the blue wavelengths (90b) and the red wavelengths (90r). At a 30-degree field angle (representing a 60-degree field of view for the optical system), there is a difference between the 90b line and 90r line of nearly 90 microns. This difference increases even more at higher viewing angles.

Turning to optical system 92, which has a positive element of N-BK7 glass and a negative element of F2 glass, the lateral chromatic aberration of this system can be measured by the separation in microns between the blue wavelengths (92b) and the red wavelengths (92r), which show an improved (lower) chromatic aberration at a 30-degree field angle of less than 60 microns. Optical system 94, which has a positive element of N-BK7 glass and a negative element of polystyrene, shows an even more improved chromatic aberration, with a separation of less than about 2-3 microns for all viewing angles from 0 to 30 degrees.

Figure 4B:
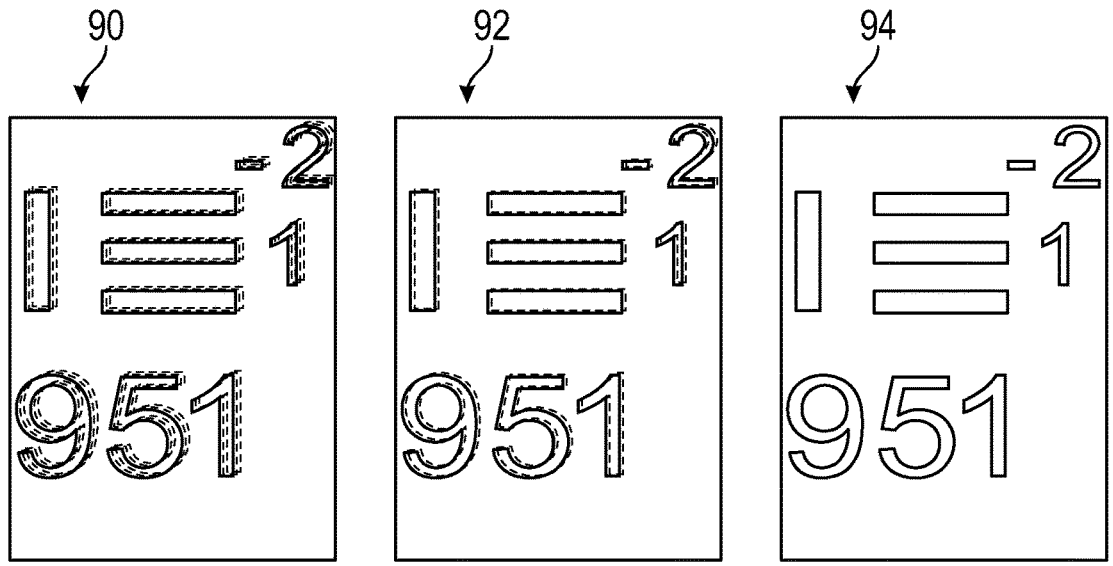

FIG. 4B provides simulated images formed by each of optical systems 90, 92, and 94 near the edge of the field of view. Although color images would better illustrate the color fringing seen on each of the images, the lateral chromatic aberrations can be seen in these black and white images as multiple images shifted left or right due to the lateral chromatic aberrations. Optical system 90, which has a positive element and negative element of both the same N-BK7 material, shows the effects of the lateral color shift shown in FIG. 4A for optical system 90. Optical system 92, with the F2 negative element, is a significant improvement in color fringing and image quality over optical system 90, and optical system 94, using the polystyrene negative element, shows the best performance of all three systems, with regard to lateral chromatic aberration.

It should be noted that configuring a system to reduce lateral chromatic aberrations, as shown in FIG. 4A, may not always have a corresponding improvement in longitudinal chromatic aberrations. That is, configuring an optical system such as configuration 94 in FIG. 4A, which has the best (lowest) lateral chromatic aberration of the three systems modeled, may have an adverse effect on the longitudinal chromatic aberrations. The optical system must be configured to achieve the best balance between the two types of chromatic aberration, based on the performance requirements of the system being designed. As is discussed elsewhere herein, other methods may be used to lower longitudinal chromatic aberrations in an optical system to compensate for these adverse effects.

Figure 5:
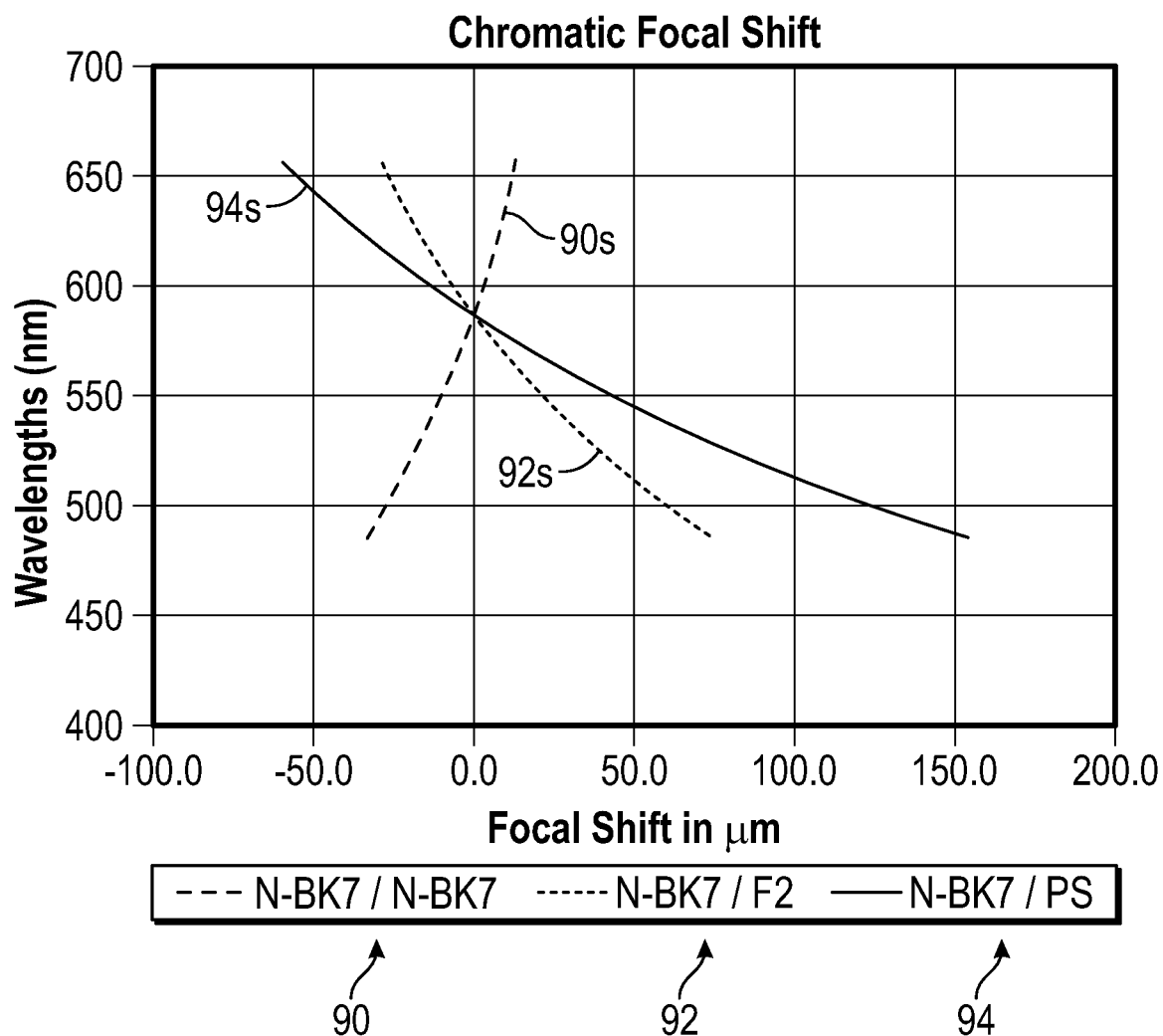
FIG. 5 is a chart showing levels of longitudinal chromatic aberrations (differences in the focal plane) exhibited by different system material types, in accordance with an embodiment of the present description.

FIG. 5 is a chart showing levels of longitudinal chromatic aberrations (differences in focal distance) exhibited by the three different system material types described in conjunction with the description of FIG. 4A. FIG. 5 plots the variation in focal plane position along the optical axis in microns (x-axis) over a range of human-visible wavelengths (y-axis) from about 486 nm to about 656 nm. It should be noted that the focal distance data of FIG. 5 is shown only for the central, on-axis field angle. As in FIG. 4, the zero longitudinal focal shift reference is taken as the focal plane position at 588 nm wavelength for each system.

As with FIG. 4A, the three systems plotted in FIG. 5 are as follows:
Optical System 90: Positive element of N-BK7 glass, negative element of N-BK7 glass.
Optical System 92: Positive element of N-BK7 glass, negative element of F2 flint glass.
Optical System 90: Positive element of N-BK7 glass, negative element of polystyrene plastic.

In this case, the variation in focal distance (focal shift) seen for optical system 90 shows the best longitudinal chromatic aberration performance, as shown by plotline 90s. Optical system 92 has the second-best performance (plotline 92s), and optical system 94, which had the best lateral chromatic aberration performance (see FIG. 4A), had the worst longitudinal chromatic aberration (plotline 94s).

Figure 6:
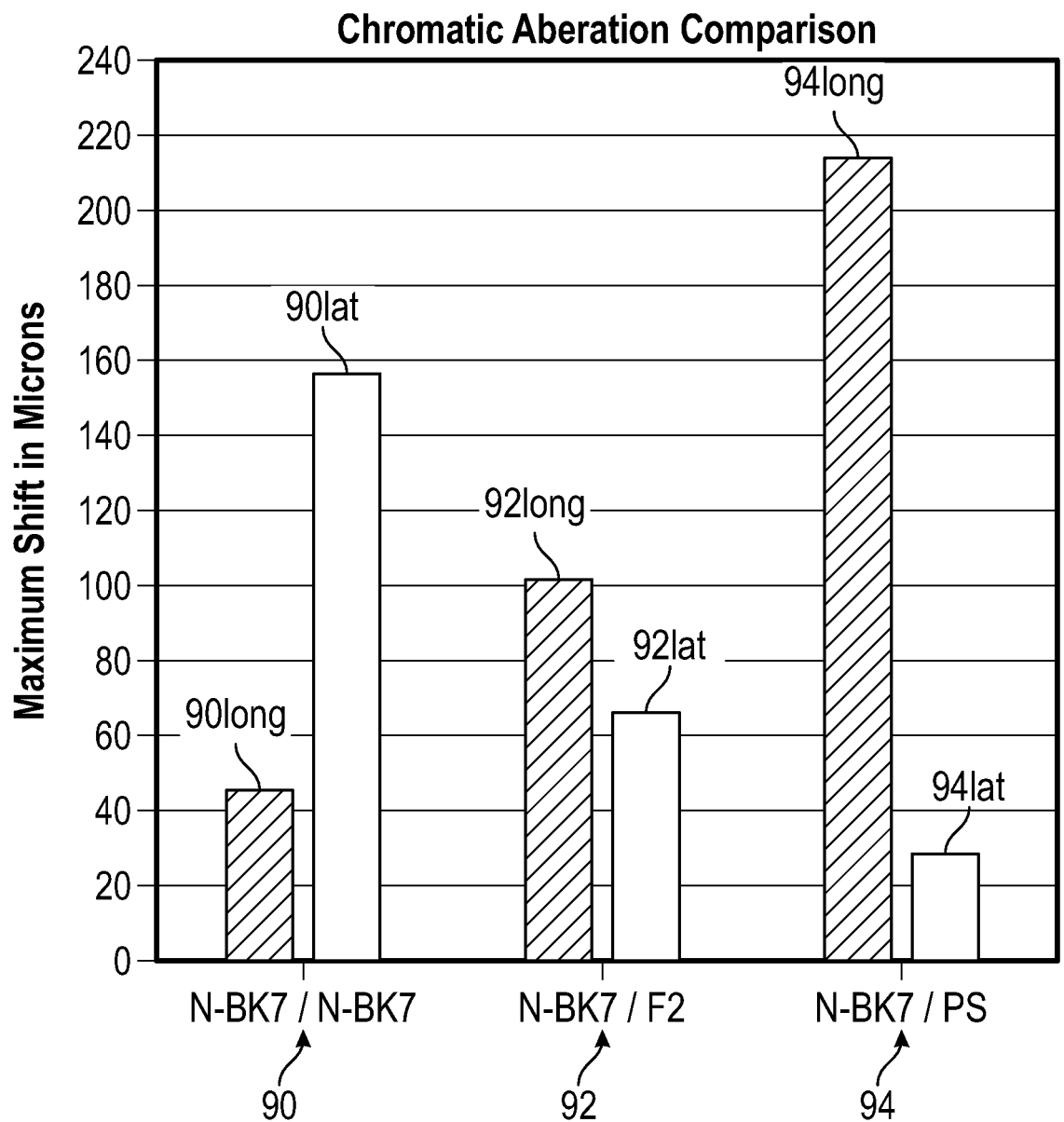
FIG. 6 is a bar chart summarizing various types of chromatic aberrations exhibited by different system material types, in accordance with an embodiment of the present description.

It should be noted that the human eye can often handle small differences in focal shift (longitudinal chromatic aberrations) more readily that it can handle small differences in lateral color shift, as the human eye can readily adapt to small changes in the diopter focus of the lens. For example, when gazing at a small region of the virtual image comprising a wide range of colors (i.e., multiple wavelengths), the eye will find an optimum focus and light of some wavelengths may have a slightly less sharp focus on the fovea of the eye, resulting in a small extent of retinal blur. As another example, if the gaze of the eye is changing between two adjacent regions of the virtual image comprising red and blue colors, for which the optical system has different diopter foci due to longitudinal color aberration, the eye can change focus (i.e., accommodate) to sharply view both the red image area and blue image area sequentially. If the difference in focus is small, the change in focus (accommodation) of the eye will be imperceptible, as will be any small amount of retinal blur. Because of this, in configuring an optical system, especially an optical system forming a virtual image for viewing by the eye such as a head-mounted display optical system, it is often best to design the system focusing on reducing lateral chromatic aberrations, with a goal of reducing longitudinal aberrations as a second priority. Sometimes this can mean making trade-offs when designing the optical system. FIG. 6 is a bar chart comparing the amount of longitudinal chromatic aberration versus the amount of lateral chromatic aberration for each of the three material types discussed herein. It should be noted that the materials chosen for the modeling are examples only and other materials with different optical or mechanical properties may be used within the scope of this description.

The labels along the x-axis of FIG. 6 show the three different optical systems described elsewhere herein, 90 (N-BK7 negative element), 92 (F2 negative element), and 94 (polystyrene (PS) negative element). For each system type, there are two bars: a black bar showing the on-axis focal distance variation in microns and a white bar showing the maximum (i.e., at the widest field angle) lateral color shift in microns. As can be seen in the graph of FIG. 6, optical system 90 has the best (lowest) longitudinal chromatic aberration performance (90long), but the worst (highest) lateral chromatic aberration performance (90lat). Optical system 94, on the other hand, shows excellent lateral performance (94lat) but a relatively high longitudinal shift (94long). Optical system 92 provides a balance between lateral performance (92lat) and longitudinal color shift (92long). Depending on the requirements for the optical system being configured, one could select different material for the positive and negative lens elements which provide acceptable amounts of both lateral and longitudinal chromatic aberration.

Figure 7A:
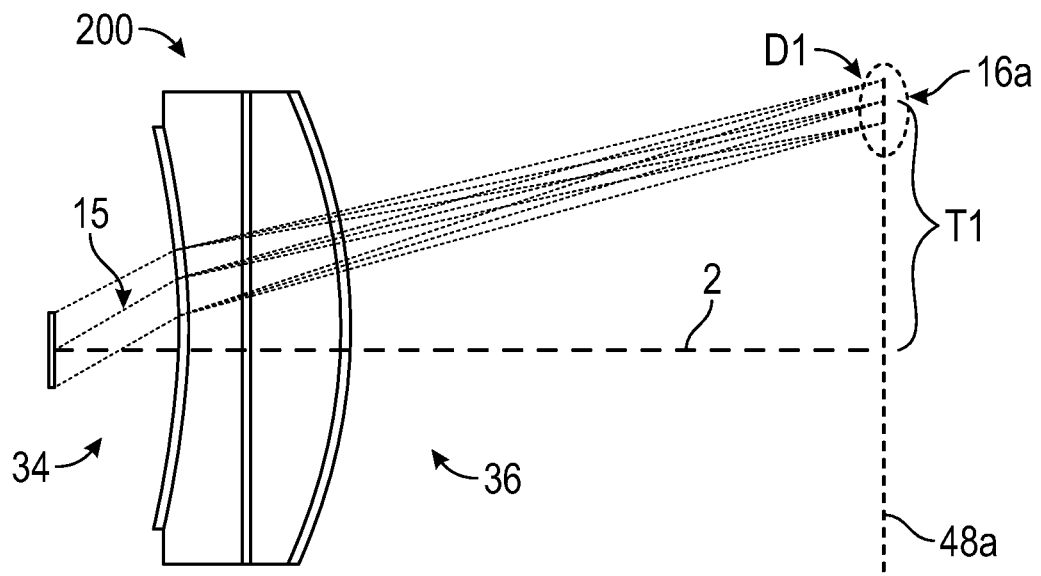
FIGS. 7A and 7B provide a comparison between chromatic aberrations of a single-pass optical system and a triple-pass (folded) optical system, in accordance with an embodiment of the present description.
Figure 7B:
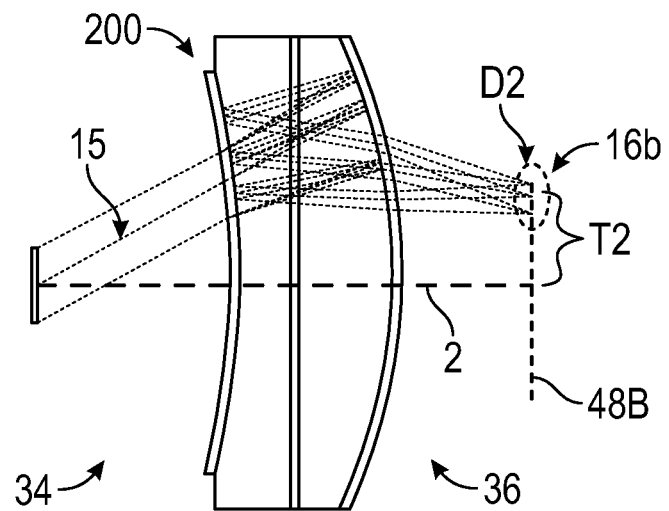

FIGS. 7A and 7B provide a comparison of the amount of chromatic aberrations of an optical system when used as a single-pass optical system versus the same optical system used as a triple-pass (folded) optical system. In FIG. 7A, when light rays 15 (e.g., substantially unpolarized, collimated light rays) are incident on optical lens assembly 200 from viewer-side 34 for a given non-zero field angle, the optical lens assembly 200 may focus the light rays 15 on the display-side 36 of the optical lens assembly 200 to form a first focused incident light 16a as part of a first focused image 48a at an average spacing T1 from optical axis 2 after the incident light rays 15 passes through optical lens assembly 200 for a first time (i.e., after a single pass through optical lens assembly 200, a non-folded optical path). This first focused incident light 16a may have a corresponding lateral chromatic aberration D1 (i.e., determined by the amount of shift between a blue wavelength of light and a red wavelength of light, shown as a separation of rays at point 16a).

Also, as shown in FIG. 7B, when light rays 15 are incident on optical lens assembly 200 from viewer-side 34, the optical lens assembly 200 may focus the light rays 15 on the display-side 36 of the optical lens assembly 200 to form a second focused incident light 16b as part of a second focused image 48b at an average spacing T2 from optical axis 2 after the incident light rays 15 passes through optical lens assembly 200 for a total of three times (i.e., following a folded optical path). This second focused incident light 16b may have a corresponding lateral chromatic aberration D2. Because the first focused image 48a will appear larger (after a single pass through the assembly 200) than the second focused image 48b (after three passes through assembly 200) due to the differences in magnification of a single-pass optical path versus a triple-pass, folded optical path, it is best to determine lateral chromatic aberration for a system as a percentage of focused image size. Thus, when D2/T2 is compared to D1/T1 (i.e., the normalized aberrations as a percentage of image size), D2/T2 will be less than D1/T1 by at least a factor of 2, or a factor of 3, or a factor of 4 across at least a 40-degree, or a 45-degree, or a 50-degree, or a 55-degree, or a 65-degree, or a 70-degree field of view.

It should be noted that, for the purpose of clarity, light rays 15 as shown in FIGS. 7A and 7B do not necessarily show subtle amounts of refraction that may occur within optical lens assembly 200 at the interfaces between lens components and other layers. These figures are intended to show the resulting lateral chromatic aberrations D1 and D2 that can occur for the focused images.

Figure 8:
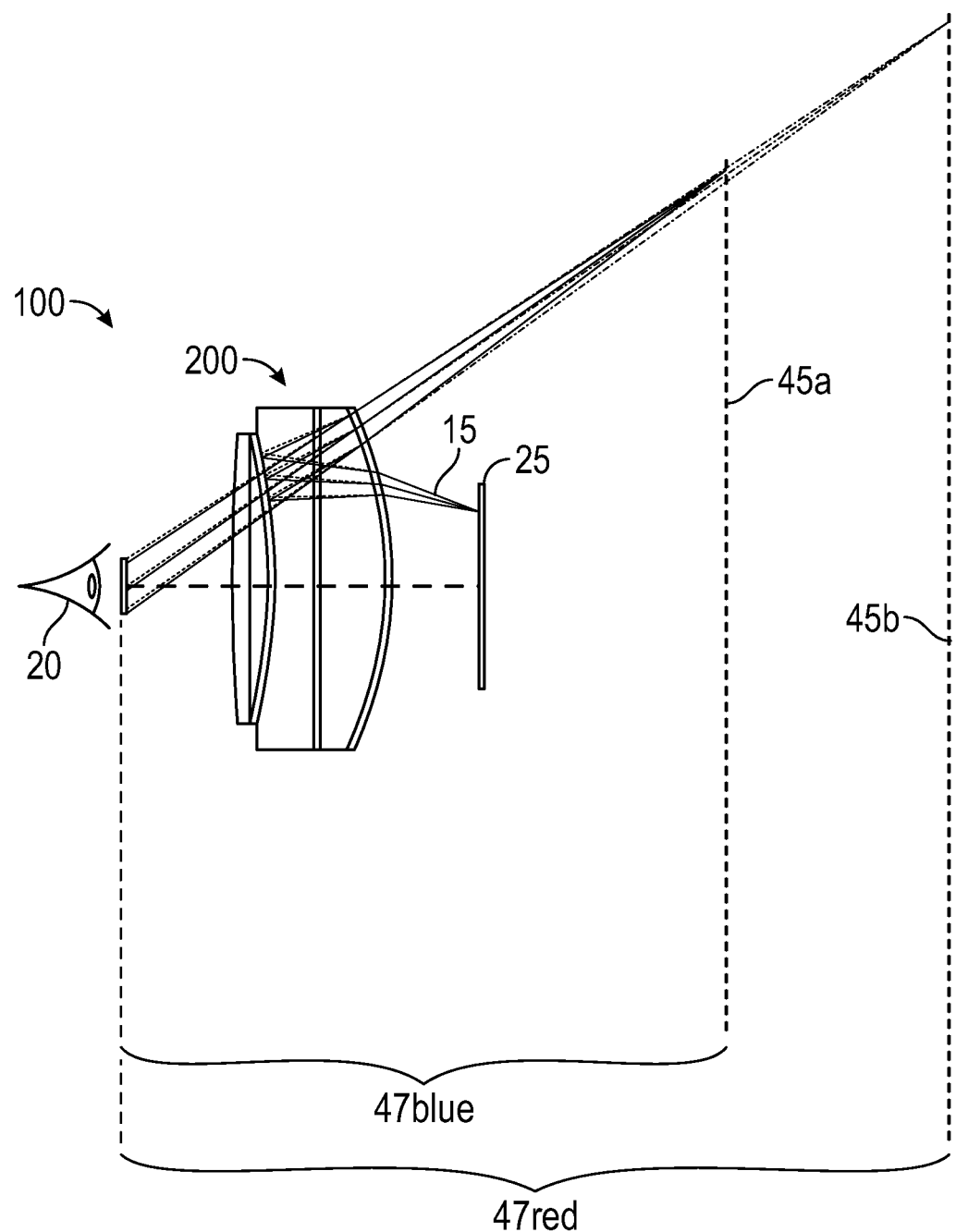
FIG. 8 shows how a longitudinal (axial) chromatic shift in an optical system can create different virtual image planes based on wavelength of light, in accordance with an embodiment of the present description.

FIG. 8 depicts the effects of a longitudinal (axial) chromatic aberration in an optical system (such as optical system 100 of FIG. 3). In some embodiments, display 25 emits image rays 15 which form a virtual image after passing through optical lens assembly 200 along the triple-pass, folded optical path. As a result of passing through optical lens assembly 200, image rays 15 experience some amount of axial chromatic shift, as explained elsewhere herein, and the thus individual wavelengths of light from image rays 15 that eventually reach the eye of a user 20 will form virtual images that vary in virtual image distance (e.g., wavelengths of blue light may appear to come from an image closer to the viewer 20, and wavelengths of red light may appear to come from an image farther away from viewer 20). FIG. 8 shows that the slight difference in divergence angles of the incoming light of different wavelengths will cause viewer 20 to perceive a first virtual image 45a (created primarily from blue wavelengths) and a second virtual image 45b (created primarily from red wavelengths). First virtual image 45a will appear to be at a first virtual image distance $47_{blue}$ from viewer 20, and second virtual image 45b will appear to be at a second virtual image distance $47_{red}$ from viewer 20.

Longitudinal chromatic aberration is usually used to describe a difference across wavelengths of the position of a real image plane along an optical axis. For an eyepiece or an optical system forming a virtual image of an object such as a display (or forming a virtual image of an intermediate image), the effect of lateral chromatic aberration is a difference across wavelengths in the virtual image distance, and this difference in virtual image distance can be expressed in diopters.

Figure 9:
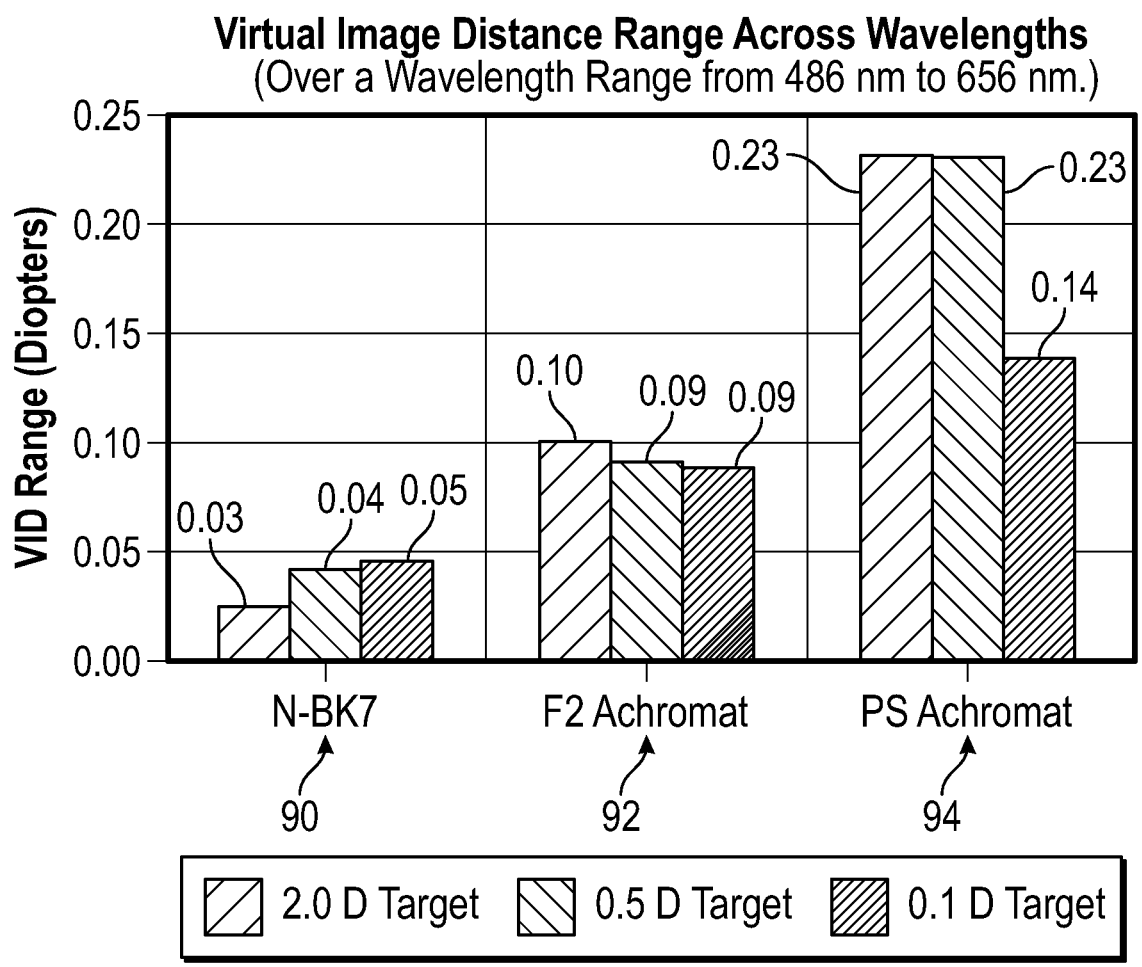
FIG. 9 is a bar chart illustrating the differences in virtual image distance across wavelengths of light as measured in optical diopters, in accordance with an embodiment of the present description.

FIG. 9 is a bar chart illustrating the differences in virtual image distance across wavelengths of light as measured in optical diopters, in accordance with an embodiment of the present description. The y-axis of the bar chart of FIG. 9 represents the magnitude of the difference in virtual image distance (VID) between a first visible wavelength (e.g., a wavelength of blue light) and a second visible wavelength (e.g., a wavelength of red light). The range of wavelengths extends between 486 nm to 656 nm. These values (the height of the bars in the graph) is shown in units of optical diopters. Each of the three optical systems 90 (with a negative element of N-BK7 glass), 92 (with a negative element of F2 glass), and 94 (with a negative element of polystyrene) are shown across the x-axis. For each of the three optical systems 90, 92, and 94, VID range values are shown as modeled at three different target image distance values. That is, each system has a VID range value/difference for a 2.0 diopter target (0.5 meter image distance), for a 0.5 diopter target (2 meter image distance), and for a 0.1 diopter target (10 meter image distance). The target virtual image distance can be readily adjusted by changing the position of the object (e.g., display) relative to the back focal length (i.e., working distance) of the optical system.

As shown in the modeled data of FIG. 9, the optical lens assemblies of the three optical systems 90, 92, and 94 have an optical diopter that varies by less than 0.5 diopters. In some embodiments, the optical diopter varies by less than 0.4, or 0.3, or 0.2, 0.1, or 0.05 diopters. For example, even optical system 94, having a flint element of polystyrene and showing the worst performance for longitudinal chromatic aberrations, has a VID difference that is less than 0.25 for the three different target diopters. This difference in virtual image distances may be small enough that the human eye can easily adapt to the difference in virtual image distance across an image without requiring the longitudinal chromatic aberration to be otherwise mitigated.

Figure 10:
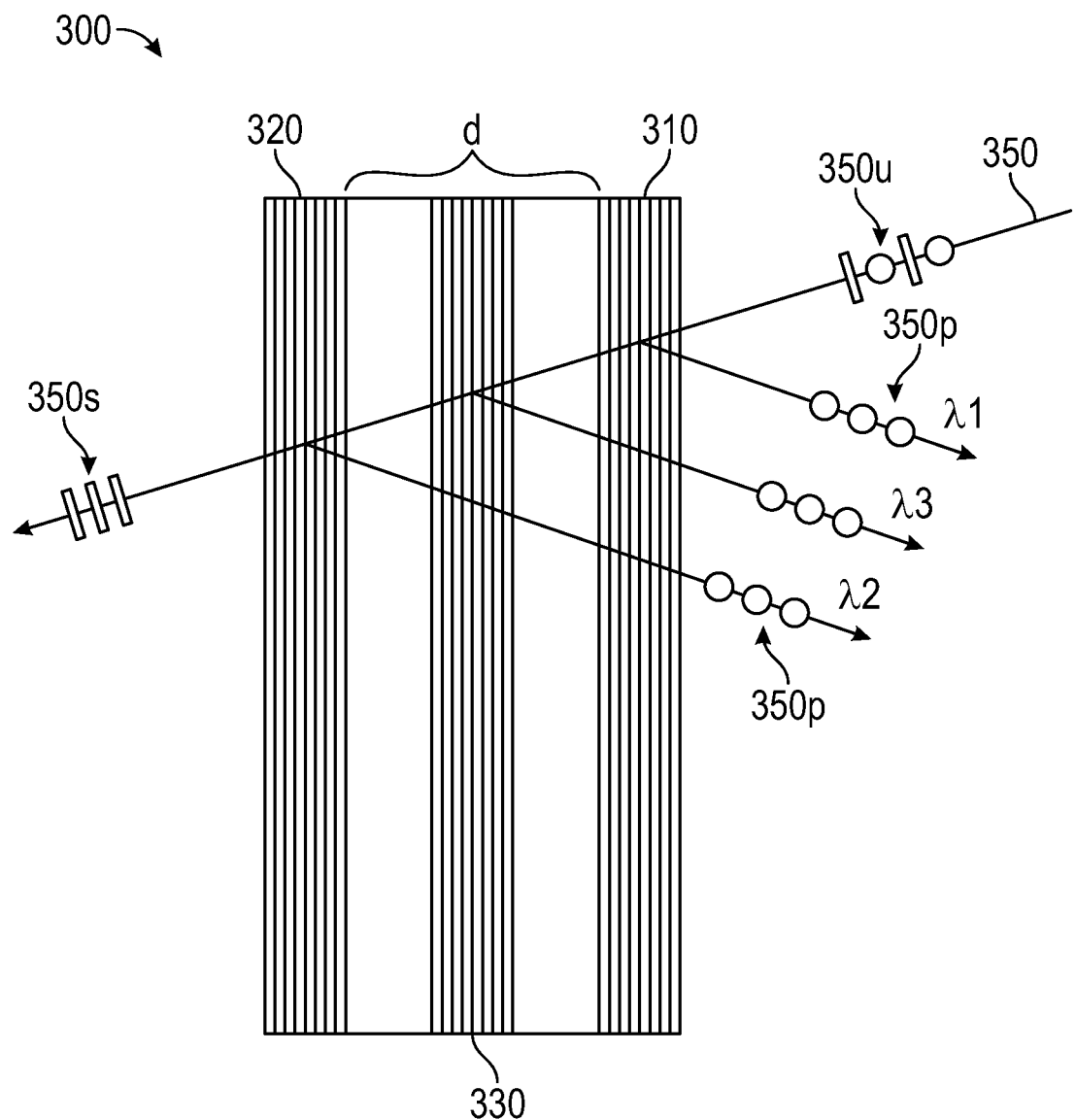
FIG. 10 shows a side view of a reflective polarizer configured to reflect light of different wavelengths from different depths within the film, in accordance with an embodiment of the present description.

In instances where it is desirable to reduce the longitudinal chromatic aberration beyond the low values shown in FIG. 9, there are other methods that can be combined with the methods of the present description which can further compensate for and reduce the longitudinal chromatic aberration. For example, FIG. 10 illustrates a multilayer optical film (e.g., a reflective polarizer) 300 that can be used in place of (or in addition to) the second partial reflector (element 70, FIG. 1). In some embodiments, optical film 300 includes a plurality of first interference layers 310 spaced apart by a distance d from a plurality of second interference layers 320. It should be noted that, in some embodiments, there may also be a plurality of third interference layers 330.

An incoming light ray 350 may be unpolarized light 350u (i.e., the light may contain multiple polarization types, as shown by the circle and bar symbols indicated by 350u) and may also contain light of multiple wavelengths (e.g., light with wavelengths λ1, λ2, and λ3, which may correspond to red, green, and blue wavelengths, respectively). As the light ray 350 enters optical film 300, light of all three wavelengths λ1, λ2, and λ3 that has a first polarization state (e.g., linearly polarized in an orientation perpendicular to a transmission axis of the reflective polarizer) may be substantially reflected by optical film 300 as reflected light 350p. Light of an orthogonal second polarization state (e.g., linearly polarized in an orientation parallel to a transmission axis of the reflective polarizer) may be substantially transmitted by optical film 300 as transmitted light 350s.

In some embodiments, each different wavelength of light with the first polarization state may be reflected from a different depth within the optical film 300. For example, in some embodiments, the plurality of first interference layers 310 may be configured to substantially reflect light of the first visible wavelength λ1 having the first polarization state, to substantially transmit light of the first visible wavelength λ1 having the second polarization state, and to substantially transmit light of the second visible wavelength λ2.

In some embodiments, the plurality of second interference layers 320 may be configured to substantially reflect light of the second visible wavelength λ2 having the first polarization state, to substantially transmit light of the second visible wavelength λ2 having the second polarization state, and to substantially transmit light of the first visible wavelength λ1.

In some embodiments, the distance d may be configured such that it reduces the variation in the optical diopter of the optical less assembly (element 200, FIG. 3) due to the difference between the first visible wavelength λ1 and the second visible wavelength λ2. Stated another way, the distance d between the plurality of first interference layers 310 and the plurality of second interference layers 320 may be configured to change the depth of reflection of light of the first λ1 and second λ1 visible wavelengths in order to compensate for the difference in virtual image distance between the first λ1 and second λ1 visible wavelengths due to longitudinal chromatic aberration.

In embodiments having a plurality of third interference layers 330, these layers may be configured to reflect light of a third visible wavelength λ1 (e.g., a green wavelength) having the first polarization state, and substantially transmit all other light.

Figure 11A:
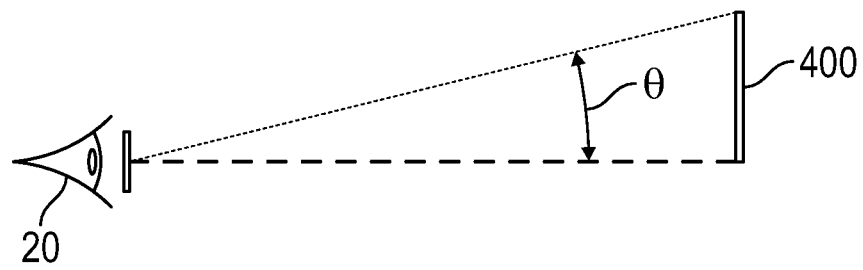
FIG. 11A-11C illustrate differences in magnification between a single-pass optical system and a triple-pass optical system (relative to an unmagnified image seen without an optical system), in accordance with an embodiment of the present description.
Figure 11B:
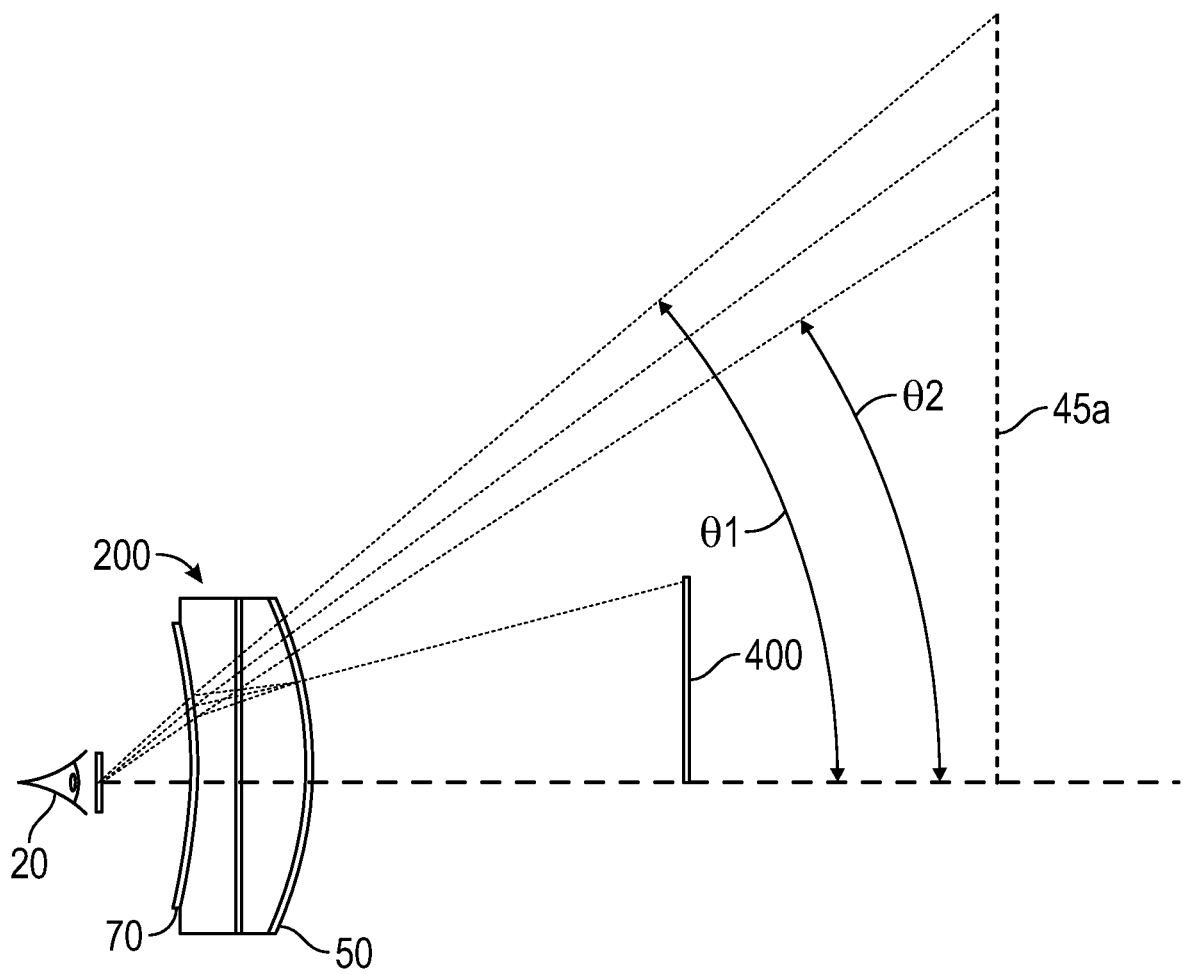
Figure 11C:
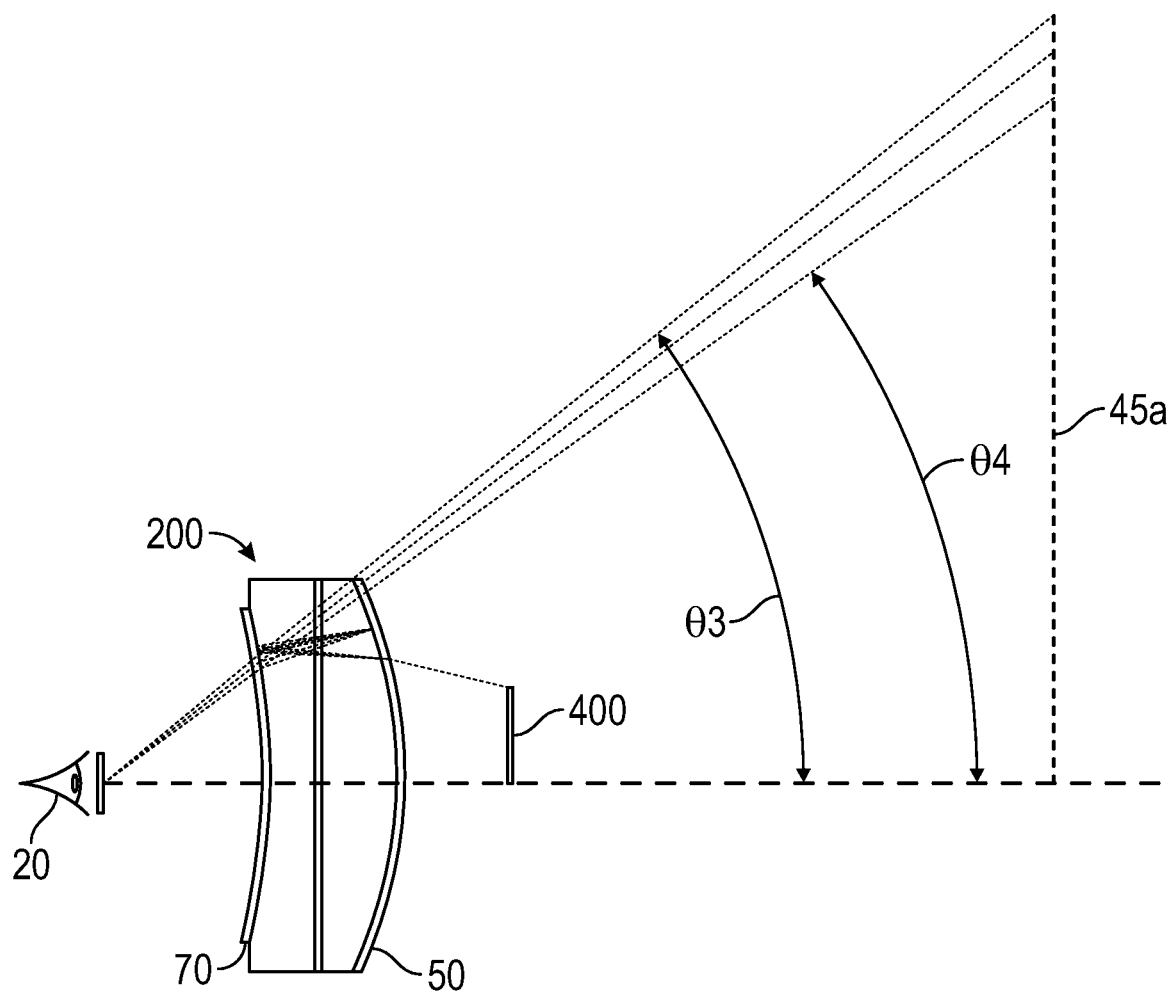

FIG. 11A-11C illustrate differences in magnification between a single-pass optical system and a triple-pass optical system (relative to an unmagnified image seen without an optical system), in accordance with an embodiment of the present description. FIG. 11A shows that an object 400, when viewed by the eye of a viewer 20 will subtend an angle θ when the viewer 20 is looking directly at the object 400 (i.e., there is no optical system between the viewer 20 and the object 400), and the object is placed at the near point of human vision. The near point of human vision is commonly considered to be 25 cm, or about 10 inches, and is the closest distance that a "normal" eye can focus, with "normal" meaning the eye is not myopic (near-sighted), hyperopic (far-sighted), or presbyopic (lacking sufficient accommodative range). This near point of human vision is used in the calculation of the magnifying power of lenses because it is the point at which an object appears largest to the eye (subtends the greatest angle) before a vision aid such as a magnifying lens is needed to make the object appear any larger (again, for a "normal" eye).

When an optical system including optical lens assembly 200 is disposed between viewer 20 and object 400, as shown in FIG. 11B, a first virtual image 45a of the object 400 will be perceived by viewer 20 after the image rays traverse a space defined between the partial reflector 50 and the reflective polarizer 70 a total of one time (single-pass, non-folded), and first virtual image 45a will have a magnification (magnifying power) due to the effects of the optical lens assembly 200. Because of this magnification, the first virtual image 45a will subtend a larger angle than it would in the unmagnified system of FIG. 11A. In fact, because of the differences in the first visible wavelength and the second visible wavelength as discussed elsewhere herein, the first virtual image 45a will subtend two different angles, a first angle θ1 for light of the first visible wavelength and a second angle θ2 for light of the second visible wavelength. The difference in subtended angles θ1 and θ2 defines the amount of lateral chromatic aberration of the optical lens assembly 200 when used as a non-folded, single-pass system.

Turning to FIG. 11C, a second virtual image 45b of the object 400 will be perceived by viewer 20 after the image rays traverse a space defined between the partial reflector 50 and the reflective polarizer 70 a total of three times (folded optical path), and second virtual image 45b will exhibit a different magnification than the single-pass system of FIG. 11B due to the effects of multiple passes through the optical lens assembly 200. Because of the differences in the first visible wavelength and the second visible wavelength as discussed elsewhere herein, the second virtual image 45b will subtend two different angles, a third angle θ3 for light of the first visible wavelength and a fourth angle θ4 for light of the second visible wavelength. The difference in subtended angles θ3 and θ4 defines the amount of lateral chromatic aberration of the optical lens assembly 200 when used as a folded optical system.

The normalized amount of lateral chromatic aberration for the single-pass system of FIG. 11B can be determined by using the formula A1=(|θ1−θ2|/((θ1+θ2)/2)). The normalized amount of lateral chromatic aberration for the three-pass, folded system of FIG. 11C can be determined by using the formula A3=(|θ3−θ4|/((θ3+θ4)/2)). The three-pass chromatic aberration A3 is less than the single-pass chromatic aberration A1. In some embodiments, A3 may be less than A1 by at least 30%, or at least 40%, or at least 50%, or at least 60%, or at least 70%, or at least 80%, or at least 90%, or at least 100%, or at least 105% over the entire field of view. Over a 50-degree, or 55-degree, or 60-degree, or 65-degree field of view, A3 may be less than A1 by at least 300%, or at least 350%, or at least 400%. In some embodiments, the magnitude of A3 itself may remain less than about 0.2%, or about 0.15%, or about 0.1%, or about 0.08%, or about 0.06%, or about 0.04%, or about 0.02% when the field angle increases from about 5 to about 40 degrees.

Figure 12:
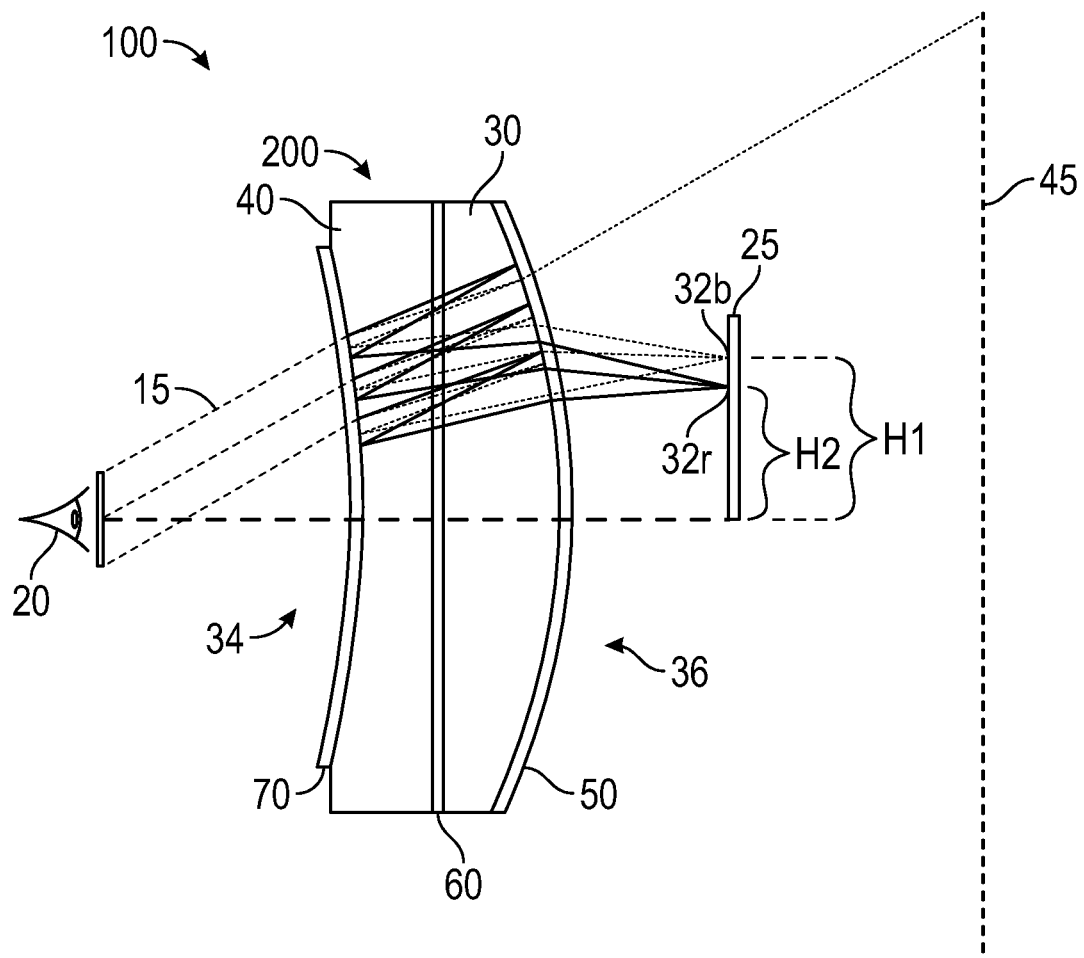
FIG. 12 illustrates a folded optical system and the effects of lateral chromatic aberration in terms of image height, in accordance with an embodiment of the present description.

FIG. 12 shows the folded optical system 100 of FIG. 3 and the effects of lateral chromatic aberration in terms of image height. In some embodiments, optical system 100 includes an optical lens assembly 200. Optical lens assembly 200 includes at least two optical lenses 30 and 40 and has at least one curved major surface. In some embodiments, optical lens assembly 200 includes a first partial reflector 50 and a second partial reflector 70 disposed on and conforming to different respective first and second major surfaces of the at least two optical lenses 30 and 40. In some embodiments, optical lens assembly 200 may further include a quarter wave retarder 60.

The optical system may be configured to have a display 25 disposed on a display-side 36 of the optical system 100 and form a virtual image 45 of an image emitted by the display 25 to a viewer 20 disposed on an opposite viewer-side 34 of optical system 100. In some embodiments, virtual image 45 is formed after the emitted image traverses (as light rays 15) a space defined between the partial reflector 50 and the second partial reflector 70 a total of three times (i.e., a three-pass, folded optical path). For first and second wavelengths in a visible wavelength range extending from about 420 nm to about 680 nm, the first and second visible wavelengths different by at least 100 nm, and due to the difference between first and second visible wavelengths, when substantially collimated light rays 15 containing at least the first and second wavelengths are incident on the optical system 100 from the viewer-side 34 near an eye location at a given field angle, and focus at respective focal points 32b (for the first visible wavelength, e.g., blue light) and 32r (for the second visible wavelength, e.g., red light) at real image heights H1 and H2, the image may have a lateral chromatic aberration such that a magnitude of (H1−H2)/((H1+H2)/2) remains less than about 0.2%, or about 0.15%, or about 0.1%, or about 0.08%, or about 0.06%, or about 0.04%, or about 0.02% when the field angle increases from about 5 degrees to about 40 degrees, and remains less than about 0.15%, or about 0.1% across at least a 60-degree field of view.

Figure 13:
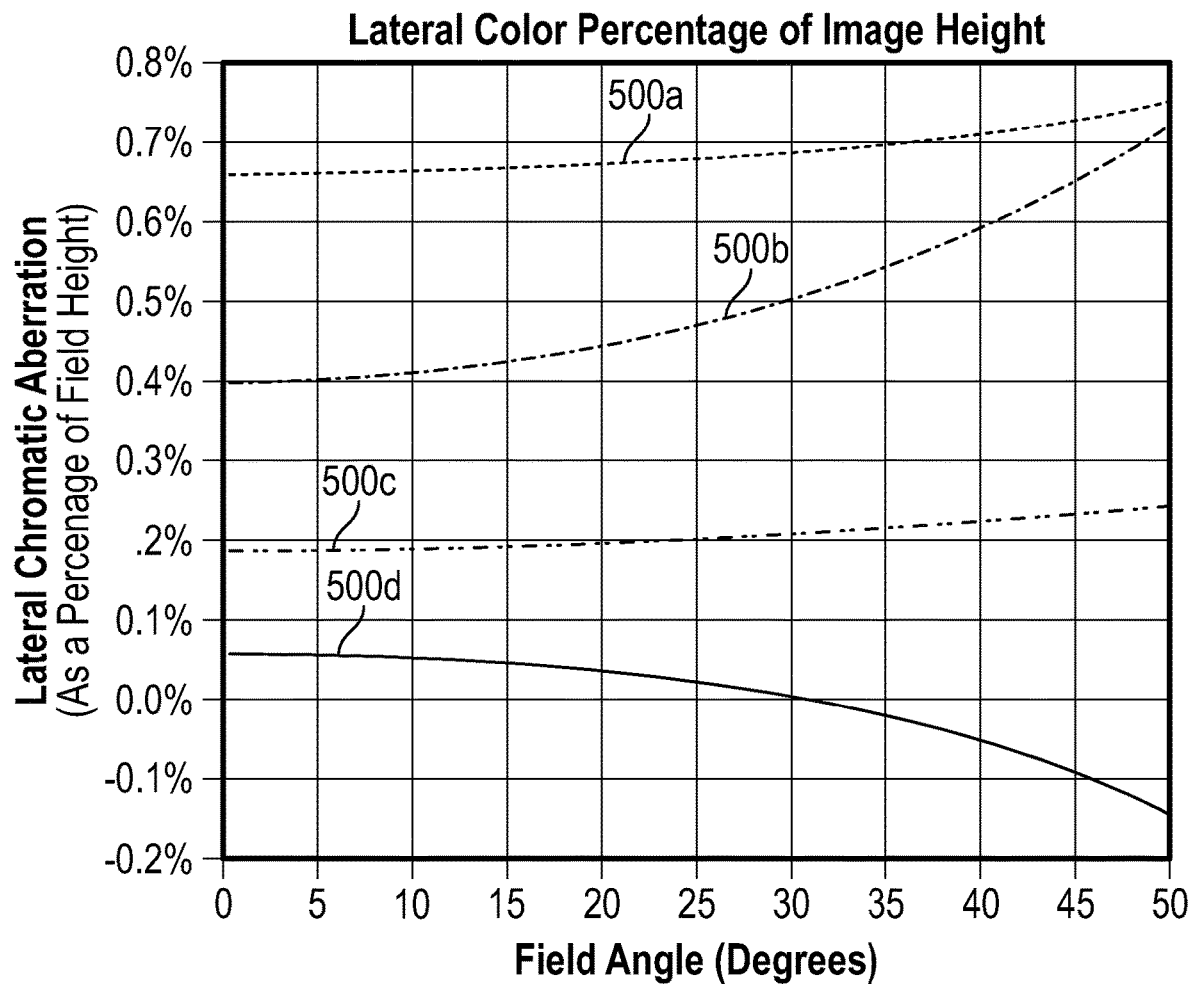
FIG. 13 is a graph showing lateral color (shift) as a percentage of the image height, in accordance with an embodiment of the present description.

FIG. 13 details the modeled results of the optical system shown in FIG. 12. The chart compares the lateral chromatic aberration as a fraction of the full field of view for four different optical systems. Plotline 500a is a plot of lateral chromatic aberration (as a percentage of field height, calculated from real image heights H1 and H2 described above) for a non-achromatic triple-pass system (i.e., a triple-pass system that has not been configured according to the present description). Plotline 500b is a plot of lateral chromatic aberration for a non-achromatic single-pass system (i.e., a non-folded system that has not been configured according to the present description). Plotline 500c is a plot of lateral chromatic aberration for an achromatic single-pass system (i.e., a single-pass system of the prior art that has been configured to reduce lateral aberrations). Plotline 500d is a plot of lateral chromatic aberration for an achromatic triple-pass system (i.e., a triple-pass system that has been configured according to the present description).

Plotline 500d is of most relevance to the optical system 100 of FIG. 12 and shows the magnitude of lateral chromatic aberration (as a percentage of field height) remains less than 0.2% as the field angle increases from about 5 degrees to about 40 degrees and is less than that over much of the range. Plotline 500d also shows the magnitude of lateral chromatic aberration remains less than about 0.25%, or less than about 0.22%, or less than about 0.2% across at least an 80-degree, or an 85-degree, or a 90-degree, or a 95-degree, or a 100-degree field of view. It should be noted that an 80-degree full field of view corresponds to a field angle of 40 degrees in FIG. 13 (i.e., the full field of view is twice the field angle shown).

Figure 14:
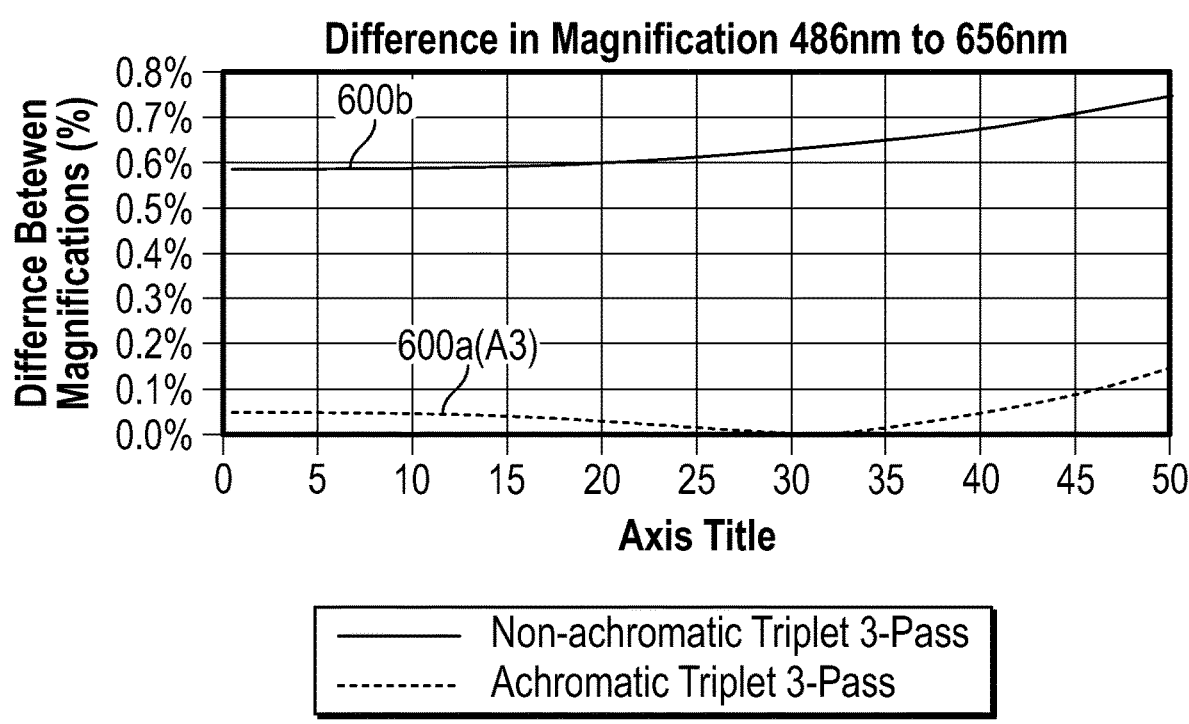
FIG. 14 is a graph showing lateral chromatic aberration as a normalized difference in magnification between two wavelengths.

Finally, FIG. 14 shows the magnitude of A3, (i.e., the normalized amount of lateral chromatic aberration for the three-pass, achromatic system, as discussed elsewhere herein, where the chromatic aberration is shown as a normalized difference in magnification between a blue wavelength at 486 nm and a red wavelength at 656 nm) remaining less than about 0.2%, or less than about 0.15%, or less than about 0.1%, or less than about 0.05% when the field angle increases from about 5 to about 40 degrees (see, for example, plotline 600a). For comparison purposes, plotline 600b shows the normalized amount of lateral chromatic aberration for a non-achromatic triplet three-pass system (i.e., a three-pass system which does not practice the methods taught in the present description).

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed:

1. An optical lens assembly comprising an optical axis and configured to be viewed by a viewer from a viewer-side of the optical lens assembly, to have a display disposed on an opposite display-side of the optical lens assembly, and to display a virtual image of an image emitted by the display to the viewer after the emitted image passes through the optical lens assembly three times, the optical lens assembly comprising:
   at least two optical lenses having at least one curved major surface;
   a partial reflector disposed on and conforming to a first major surface of the lens assembly and having an average optical reflectance of at least 30% for at least each of first and second visible wavelengths in a visible wavelength range extending from about 420 nm to about 680 nm, the first and second visible wavelengths different by at least 100 nm; and
   a reflective polarizer disposed on and conforming to a second, different than the first, major surface of the lens assembly, such that for a substantially normally incident light and for each of the first and second visible wavelengths, the reflective polarizer has an optical reflectance of greater than about 60% for the incident light polarized along a first direction and an optical transmittance of greater than about 60% for the incident light polarized along a second direction, orthogonal to the first direction;
   such that for a substantially unpolarized collimated light incident on the lens assembly from the viewer-side, the lens assembly focuses the incident light on the display-side of the optical system and forms a first focused incident light at an average spacing T1 from the optical axis after the incident light passes through the lens assembly for a first time and a second focused incident light at an average spacing T2 from the optical axis after the incident light passes through the lens assembly for second and third times, wherein T1 is measured within a plane substantially orthogonal to the optical axis and containing focal points of the first focused incident light and T2 is measured within a plane substantially orthogonal to the optical axis and containing focal points of the second focused incident light, such that due to the difference between the first and second visible wavelengths, the first and second focused incident lights have respective lateral chromatic aberrations D1 and D2, D2/T2<D1/T1 by at least a factor of about 2 across at least a 40-degree field of view.

2. The optical lens assembly of claim 1, such that due to the difference between the first and second visible wavelengths, the optical lens assembly has an optical diopter that varies by less than 0.5 diopters.

3. The optical lens assembly of claim 1, wherein the reflective polarizer comprises a plurality of first interference layers spaced apart by a distance d from a plurality of second interference layers;
   wherein the plurality of first interference layers is configured to substantially reflect light of the first visible wavelength having a first polarization state, to substantially transmit light of the first visible wavelength having an orthogonal second polarization state, and to substantially transmit light of the second visible wavelength, and
   the plurality of second interference layers is configured to substantially reflect light of the second visible wavelength having a first polarization state, to substantially transmit light of the second visible wavelength having an orthogonal second polarization state, and to substantially transmit light of the first visible wavelength,
   wherein the distance d reduces a variation in an optical diopter of the optical lens assembly due to the difference between the first and second visible wavelengths.

4. The optical lens assembly of claim 3, wherein the distance d reduces the variation in the optical diopter of the optical lens assembly by at least 10%.

5. The optical lens assembly of claim 1, wherein the first visible wavelength is in a blue wavelength range extending between about 420 nm and about 480 nm, and the second visible wavelength is in a red wavelength range extending between about 590 nm and about 670 nm.

6. An optical system comprising an optical axis and configured to have a display disposed on a display-side of the optical system and form a virtual image of the display for a viewer disposed on an opposite viewer-side of the optical system, the optical system comprising:
- a partial reflector having an average optical reflectance of at least 30% for at least each of first and second visible wavelengths in a visible wavelength range extending from about 420 nm to about 680 nm, the first and second visible wavelengths different by at least 100 nm; and
- a reflective polarizer, such that for each of the first and second visible wavelengths, the reflective polarizer has an optical reflectance of greater than about 60% for the incident light polarized along a first direction and an optical transmittance of greater than about 60% for the incident light polarized along a second direction, orthogonal to the first direction;
- such that when an object is placed near a first focal plane of the optical system a first virtual image is formed when light propagating from the object towards the optical system traverses a space defined between the partial reflector and the reflective polarizer a total of one time, and when the same object is placed near a second focal plane of the optical system a second virtual image is formed when light propagating from the object towards the optical system traverses a space defined between the partial reflector and reflective polarizer a total of three times,
- wherein the first virtual image subtends an angle θ1 for light of the first visible wavelength and subtends a second angle θ2 for light of the second visible wavelength,
- the second virtual image subtends a third angle θ3 for light of the first visible wavelength and subtends a fourth angle θ4 for light of the second visible wavelength,
- wherein A1=(|θ1−θ2|/((θ1+θ2)/2)) and A3=(|θ3−θ4|/((θ3+θ4)/2)), A3 is less than A1.

7. The optical system of claim 6, wherein A3 is less than A1 by at least 30%.

8. The optical system of claim 6, wherein A3 is less than A1 by at least 300% across at least a 50-degree field of view.

9. The optical system of claim 6, wherein a magnitude of A3 remains less than about 0.2% when the field angle increases from about 5 to about 40 degrees.

10. The optical system of claim 6, such that due to the difference between the first and second visible wavelengths, the optical system has an optical diopter that varies by less than 0.5.

11. The optical system of claim 6, wherein the reflective polarizer comprises a plurality of first interference layers spaced apart by a distance d from a plurality of second interference layers;
- wherein the plurality of first interference layers is configured to substantially reflect light of the first visible wavelength having a first polarization state, to substantially transmit light of the first visible wavelength having an orthogonal second polarization state, and to substantially transmit light of the second visible wavelength, and
- the plurality of second interference layers is configured to substantially reflect light of the second visible wavelength having a first polarization state, to substantially transmit light of the second visible wavelength having an orthogonal second polarization state, and to substantially transmit light of the first visible wavelength, wherein the distance d reduces a variation in an optical diopter of the optical system due to the difference between the first and second visible wavelengths.

12. The optical system of claim 11, wherein the distance d reduces the variation in the optical diopter of the optical system by at least 10%.

13. An optical system comprising a field of view of greater than about 60 degrees and an optical axis and configured to have a display disposed on a display-side of the optical system and form a virtual image of an image emitted by the display to a viewer disposed on an opposite viewer-side of the optical system near an eye location, the optical system comprising at least two optical lenses having at least one curved major surface, and first and second partial reflectors disposed on and conforming to different respective first and second major surfaces of the at least two optical lenses,
- wherein, the virtual image is formed after the emitted image traverses a space defined between the partial reflector and the reflective polarizer a total of three times, and
- wherein due to a difference of at least 100 nm between at least first and second wavelengths in a visible wavelength range extending from about 420 nm to about 680 nm, when substantially collimated light of the first and second wavelengths is incident on the optical system from the viewer-side near an eye location at a given field angle, and focuses at a respective focal points at real image heights H1 and H2, the image has a lateral chromatic aberration such that a magnitude of (H1−H2)/((H1+H2)/2) remains less than about 0.15% across at least a 60-degree field of view.

14. The optical system of claim 13, wherein (H1−H2)/((H1+H2)/2) is less than about 0.25% across at least an 80-degree field of view.

15. The optical system of claim 13, such that due to the difference between the first and second wavelengths, the optical system has an optical diopter that varies by less than 0.5.

16. The optical system of claim 13, wherein the reflective polarizer comprises a plurality of first interference layers spaced apart by a distance d from a plurality of second interference layers;
- wherein the plurality of first interference layers is configured to substantially reflect light of the first wavelength having a first polarization state, to substantially transmit light of the first wavelength having an orthogonal second polarization state, and to substantially transmit light of the second wavelength, and
- the plurality of second interference layers is configured to substantially reflect light of the second wavelength having a first polarization state, to substantially transmit light of the second wavelength having an orthogonal second polarization state, and to substantially transmit light of the first wavelength, wherein the distance d reduces a variation in an optical diopter of the optical system due to the difference between the first and second wavelengths.

17. The optical system of claim 16, wherein the distance d reduces the variation in the optical diopter of the optical system by at least 10%.

18. The optical system of claim 13, wherein the first wavelength is in a blue wavelength range extending between about 420 nm and about 480 nm, and the second wavelength is in a red wavelength range extending between about 590 nm and about 670 nm.

* * * * *